United States Patent
Cai et al.

(10) Patent No.: US 12,452,429 B2
(45) Date of Patent: Oct. 21, 2025

(54) PICTURE ENCODING METHOD AND APPARATUS, PICTURE DECODING METHOD AND APPARATUS, ELECTRONIC DEVICE AND STORAGE MEDIUM

(71) Applicant: ZTE CORPORATION, Shenzhen (CN)

(72) Inventors: Pinlong Cai, Shenzhen (CN); Zhao Wu, Shenzhen (CN); Ping Wu, Shenzhen (CN); Ying Gao, Shenzhen (CN); Shaowei Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 67 days.

(21) Appl. No.: 18/555,851

(22) PCT Filed: Apr. 2, 2022

(86) PCT No.: PCT/CN2022/085074
§ 371 (c)(1),
(2) Date: Oct. 17, 2023

(87) PCT Pub. No.: WO2022/222744
PCT Pub. Date: Oct. 27, 2022

(65) Prior Publication Data
US 2024/0205413 A1 Jun. 20, 2024

(30) Foreign Application Priority Data
Apr. 19, 2021 (CN) .......................... 202110420800.9

(51) Int. Cl.
*H04N 19/136* (2014.01)
*H04N 19/172* (2014.01)

(52) U.S. Cl.
CPC ......... *H04N 19/136* (2014.11); *H04N 19/172* (2014.11)

(58) Field of Classification Search
CPC .. H04N 19/136; H04N 19/172; H04N 19/186; H04N 19/85; H04N 19/70; H04N 19/146; H04N 19/154; H04N 19/117
(Continued)

(56) References Cited

U.S. PATENT DOCUMENTS

| | | | |
|---|---|---|---|
| 2013/0057646 A1* | 3/2013 | Chen ................... | H04N 19/172 348/43 |
| 2017/0251208 A1* | 8/2017 | Adsumilli ............ | H04N 19/124 |

(Continued)

FOREIGN PATENT DOCUMENTS

| | | |
|---|---|---|
| CN | 101472175 A | 7/2009 |
| CN | 110301134 A | 10/2019 |
| WO | WO20200239743 A1 | 12/2020 |

OTHER PUBLICATIONS

International Search Report in Application No. PCT/CN2022/085074, dated Jun. 16, 2022, 4 pages, including translation.
(Continued)

*Primary Examiner* — Marnie A Matt
(74) *Attorney, Agent, or Firm* — Morgan, Lewis & Bockius LLP

(57) ABSTRACT

Provided are a picture encoding method, a picture encoding apparatus, a picture decoding method, a picture decoding apparatus, an electronic device and a storage medium. The encoding method includes: acquiring a video picture, and determining a picture feature of the video picture; determining in-loop identification information and out-loop identification information according to the picture feature; processing the video picture according to the in-loop identification information and the out-loop identification information; and encoding the processed video picture to generate a code stream, and writing the in-loop identification information and the out-loop identification information into the code stream. Therefore, the processing of a video picture is
(Continued)

achieved both encoding and decoding out-loop and encoding and decoding in-loop according to the picture feature during a picture transmission process, thereby effectively improving the video encoding and decoding efficiency and improving the quality of a decoded picture at the same code rate.

20 Claims, 10 Drawing Sheets

(58) Field of Classification Search
USPC .................................................. 375/240.02
See application file for complete search history.

(56) References Cited

U.S. PATENT DOCUMENTS

| | | | | |
|---|---|---|---|---|
| 2019/0246114 | A1* | 8/2019 | Tourapis | H04N 19/513 |
| 2020/0213584 | A1* | 7/2020 | Gamei | H04N 19/60 |
| 2020/0267392 | A1* | 8/2020 | Lu | H04N 19/159 |
| 2020/0288159 | A1* | 9/2020 | Van der Auwera | H04N 19/45 |
| 2020/0329257 | A1* | 10/2020 | Zhao | H04N 19/615 |
| 2021/0112246 | A1* | 4/2021 | Aono | H04N 19/172 |

OTHER PUBLICATIONS

First Office Action in Japanese Application No. 2023-564254, dated Nov. 6, 2024, 19 pages, including translation.

Jianle Chen, et al., "Algorithm description for Versatile Video Coding and Test Model 12 (VTM 12)", Document: JVET-U 2002-v1, [online] and Joint Video Experts Team (JVET) of ITU-TSG 16 WP 3 and ISO/IEC JTC 1/SC 29 and JVET-U2002 (version 1), Apr. 12, 2021, pp. 1, 8, and 9 and 79-84, [Reiwa 6(2024) Nov. 8 search], the Internet, and <URL: https://jvet-experts.org/doc_end_user/current_document.php?id=10676> and <URL: https://jvet-experts.org/doc_end_user/documents/21_Teleconference/wg11/JVET-U2002-v1.

Edouard Francois, et al., "AHG9: Out-of-loop luma mapping with chroma scaling using APS or SEI message parameters signalling", Document:JVET-U0078, [online] and Joint Video Experts Team (JVET) of ITU-TSG 16WP3 and ISO/IEC JTC 1/SC 29 and JVET-U0078 (version 1), Dec. 30, 2020 and pp. 1-6, [Reiwa 6(2024) Nov. 8 search] and the Internet, <URL: https: //jvet-experts.org/doc_end_user/current_document.php?id=10592> and <URL: https://jvet-experts.org/doc_end_user/documents/21 _.

International Telecommunication Union, "Recommendation ITU-T H.265 (Feb. 2018)", [online], ITU-T and Edition 5.0, Feb. 13, 2018, pp. 15, 37-39, 46-48, 87, and 100, [Reiwa 4(2022) May 2 search], the Internet, and <URL: https://www.itu.int/rec/T-REC-H.265-201802-S/en>.

Ken Nakajo, "Loop Inner Filter", The Journal of the Institute of Image Information and Television Engineers, vol. 67, No. 7, General Incorporated Foundation Institute of Image Information and Television Engineers, 2013, the 545-548th Page, [Reiwa 6(2024) Nov. 8 Search], and Internet, <URL: https: //www.jstage.jst.go.jp/article/itej/67/7/67_545/_article/-char/ja> and <URL: https://www.jstage.jst.go.jp/article/itej/67/7/ 67_545/_pdf>.

Andrey Norkin, "Alternative Film Grain Characteristics SEI Message", Document: JCTVC-AM0026-V2, [Online], Joint Collaborative Team on Video Coding (JCT-VC) of ITU-TSG 16 WP 3 and ISO/IEC JTC 1/SC 29/WG 11 and JCTVC-AM0026 (version 2), Apr. 20, 2020 and pp. 1-16, [Reiwa 6(2024) Nov. 9 search] and the Internet, <URL: https://mpeg.expert/jct/meetings/meeting_182.html> and <URL: https://mpeg.expert/jct/files/JCTVC-AM0026-v2.zip>.

Extended European Search Report in Application No. 22790853.0 dated Mar. 25, 2025, 10 pages.

* cited by examiner

PICTURE ENCODING METHOD AND APPARATUS, PICTURE DECODING METHOD AND APPARATUS, ELECTRONIC DEVICE AND STORAGE MEDIUM

CROSS-REFERENCE TO RELATED APPLICATION(S)

This is a national stage application filed under 37 U.S.C. 371 based on International Patent Application No. PCT/CN2022/085074, filed Apr. 2, 2022, which claims priority to Chinese Patent Application No. 202110420800.9 filed with the China National Intellectual Property Administration (CNIPA) on Apr. 19, 2021, the disclosures of which are incorporated herein by reference in their entireties.

TECHNICAL FIELD

The present application relates to the field of picture processing technology, for example, a picture encoding method, a picture encoding apparatus, a picture decoding method, a picture decoding apparatus, an electronic device and a storage medium.

BACKGROUND

With the development of information technology, the global Internet traffic has increased dramatically, among which the video traffic accounts for about 80% of the total traffic. Video exists in all aspects of life in various forms, including common radio and television, Internet media, video calls, video conferences and video surveillance. The development of network bandwidth, display and storage technologies has further promoted the development of video with high-quality display, and high dynamic range (HDR) video comes into being. The HDR video has a larger exposure dynamic range, and the HDR video can present the real world more accurately than the conventional video, bringing better experience to users. The Joint Video Experts Team (JVET) of the International Organization for Standardization (ISO)/International Electrotechnical Commission (IEC) is committed to formulating the international video encoding and decoding standards and adopts the general test sequence where the video converted from hybrid log-gamma (HLG) and perceptual quantizer (PQ) is used as of the HDR video. However, the HDR video has a larger luma range and thus occupies a larger storage space, and therefore, a more efficient video encoding and decoding technique is required to process the HDR video.

The mapping transformation of luma and chroma can be applied both outside an encoding and decoding loop and inside the encoding and decoding loop. The encoding and decoding loop herein includes an encoding loop and a decoding loop. The processing process in the loop is the process where conventional encoding and decoding tools function, where the encoding and decoding tools may include blocking, intra prediction, inter prediction, transformation and quantization, loop filtering, etc. "Inside the encoding and decoding loop" may be referred to as being in-loop, and "outside the encoding and decoding loop" may be referred to as being out-loop. In-loop luma mapping with chroma scaling (LMCS) technology has been adopted in the new generation of international video encoding and decoding standards issued by JVET. The LMCS technology maps the luma components of a video picture and scales the chroma components depending on the luma component mapping to achieve the purposes of saving bitstreams and improving the encoding efficiency. However, the in-loop LMCS technology has the problems of poor adaptability and low encoding efficiency. The technology of out-loop luma and chroma mapping transformation (called reshaper) was also proposed in the conventional drafting process of international video encoding standards. Such technology is intended to pre-process an inputted video before video encoding, perform mapping transformation on luma and chroma, and perform post-processing on the video outputted after decoding to restore the original video. Since the out-loop reshaper fails to coordinate with the techniques such as blocking, intra prediction, inter prediction, transformation and quantization and loop filtering in the video encoding and decoding process, the encoding performance cannot be guaranteed. An encoding and decoding method which supports a composite use of out-loop and in-loop luma and chroma mapping transformation is urgently needed to effectively improve the encoding efficiency.

SUMMARY

The main object of embodiments of the present application is to provide a picture encoding method, a picture encoding apparatus, a picture decoding method, a picture decoding apparatus, an electronic device and a storage medium to achieve the encoding and decoding method that supports a composite use of out-loop and in-loop luma and chroma mapping transformation, thereby effectively improving the video encoding and decoding efficiency and improving the quality of a decoded picture at the same code rate.

The embodiments of the present application provide a picture encoding method. The picture encoding method includes the following.

A video picture is acquired, and a picture feature of the video picture is determined; in-loop identification information and out-loop identification information are determined according to the picture feature; the video picture is processed according to the in-loop identification information and the out-loop identification information; and the processed video picture is encoded to generate a code stream, and the in-loop identification information and the out-loop identification information are written into the code stream.

The embodiments of the present application further provide a picture decoding method. The picture decoding method includes the following.

A code stream is acquired, and the code stream is parsed to obtain in-loop identification information and out-loop identification information in the code stream; the code stream is processed according to the in-loop identification information and the out-loop identification information; and the processed code stream is decoded to generate a video picture.

The embodiments of the present application further provide a picture encoding apparatus. The apparatus includes a picture acquisition module, an identification determination module, a picture processing module, and an encoding processing module.

The picture acquisition module is configured to acquire a video picture and determine a picture feature of the video picture. The identification determination module is configured to determine in-loop identification information and out-loop identification information according to the picture feature. The picture processing module is configured to process the video picture according to the in-loop identification information and the out-loop identification information. The encoding processing module is configured to encode the processed video picture to generate a code stream and write the in-loop identification information and the out-loop identification information into the code stream.

The embodiments of the present application further provide a picture decoding apparatus. The apparatus includes a code stream parsing module, a code stream processing module, and a picture decoding module.

The code stream parsing module is configured to acquire a code stream and parse the code stream to obtain in-loop identification information and out-loop identification information in the code stream. The code stream processing module is configured to process the code stream according to the in-loop identification information and the out-loop identification information. The picture decoding module is configured to decode the processed code stream to generate a video picture.

The embodiments of the present application further provide an electronic device. The electronic device includes one or more processors and a memory.

The memory is configured to store one or more programs. The one or more programs, when executed by the one or more processors, enable the one or more processors to perform the picture encoding method and/or the picture decoding method in any one of the embodiments of the present application.

The embodiments of the present application further provide a computer-readable storage medium. The computer-readable storage medium is configured to store a computer program, where the computer program, when executed by a processor, performs the picture encoding method and/or the picture decoding method in any one of the embodiments of the present application.

In the embodiments of the present application, a picture feature of an acquired video picture is determined through an encoding side, in-loop identification information and out-loop identification information are determined according to the picture feature, the video picture is processed according to the in-loop identification information and the out-loop identification information, the processed video picture is encoded into a code stream, and the in-loop identification information and the out-loop identification information are written into the code stream. The embodiments of the present application support the combination of out-loop and in-loop luma and chroma mapping transformation, thereby effectively improving the video encoding and decoding efficiency and improving the quality of a decoded picture at the same code rate.

DETAILED DESCRIPTION

It is to be understood that the embodiments described herein are intended to explain the present application and are intended not to limit the present application.

Suffixes such as "module", "part" or "unit" used to indicate elements in the subsequent description are used to facilitate the description of the present application and have no particular meaning in themselves. Therefore, "module", "part" or "unit" may be used in a mixed manner. Hereinafter, the present application will be described in detail with reference to drawings and in conjunction with embodiments. If not in collision, embodiments of the present application and features therein may be combined with each other. It is to be noted that the terms "first", "second", "third", and "fourth" in the description of the present application are used to distinguish between similar objects and are not necessarily used to describe a particular order or sequence.

Figure 1:
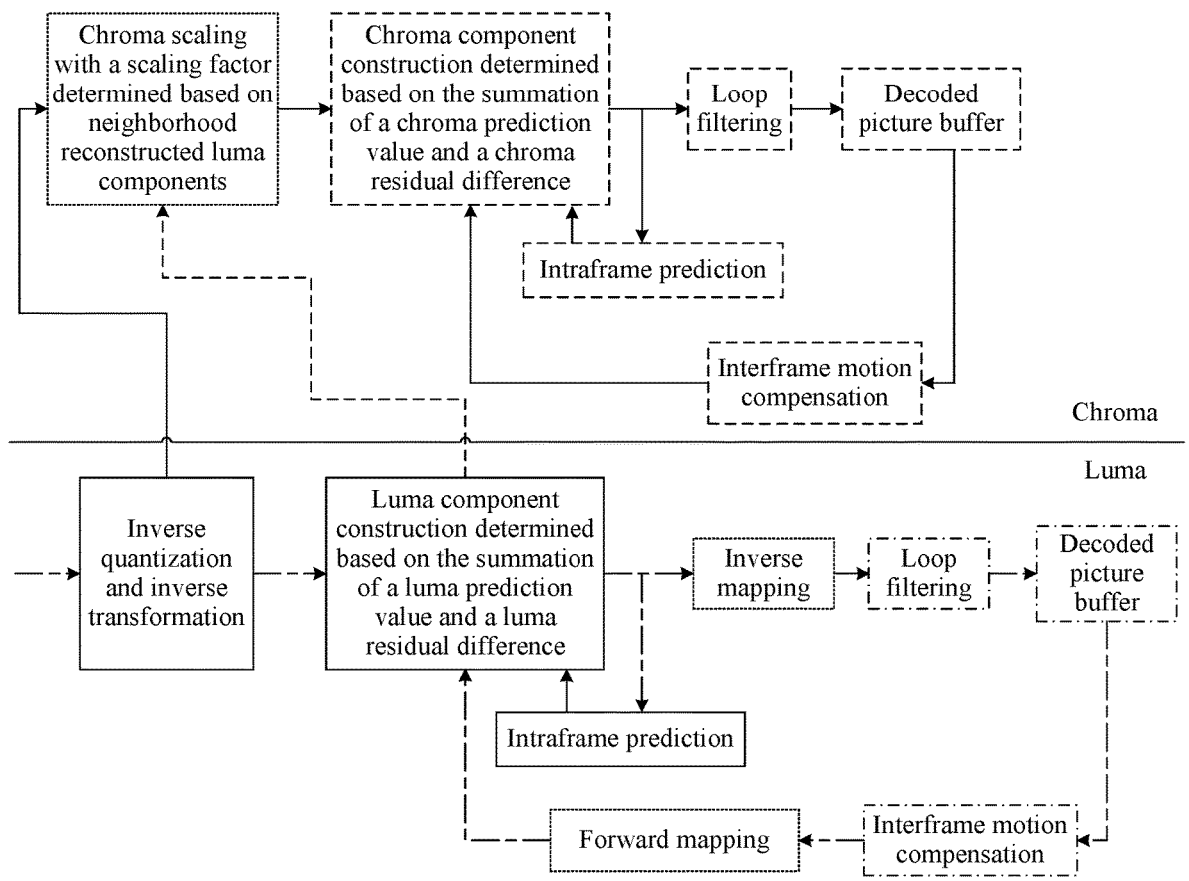
FIG. 1 is a schematic diagram of an in-loop encoding and decoding process according to an embodiment of the present application.

FIG. 1 is a schematic diagram of an in-loop encoding and decoding process according to an embodiment of the present application. FIG. 1 shows the schematic diagram of in-loop LMCS. The luma mapping and chroma scaling are newly added processes before loop filtering and the newly added processes include two main parts: one of the two main parts is implementing loop mapping of luma components based on an adaptive piecewise linear model, and the other one of the two main parts is implementing chroma components processing based on luma-dependent chroma residual scaling. As shown in FIG. 1, the newly added processes include processing in the mapping domain, where the processing in the mapping domain includes inverse quantization, inverse transformation, luma intra prediction, and summation of luma prediction and residual, and the newly added processes include the processing in the raw domain (that is, unmapped domain), where the processing in the raw domain includes loop filtering, motion compensation prediction, chroma intra prediction, summation of chroma prediction and residual, and storing a decoded picture as a reference picture; and the newly added processes also includes action blocks for in-loop luma mapping and chroma scaling, and the in-loop luma mapping and chroma scaling include forward and reverse luma signal mapping and luma-dependent chroma scaling.

The forward mapping equation is a piecewise linear model with 16 equal fragments and is specified in the code stream. The inverse mapping equation does not need to be specified and is derived from the forward mapping equation. In the piecewise linear model, the luma dynamic range of an inputted video is divided into 16 equal fragments, and the linear mapping parameters of each fragment may be assigned based on the number of codewords. Taking the 10-bit input as an example, each fragment of the 16 equal fragments has 64 codewords (16*64=1024=2^10) by default, and the number of codewords specified in each fragment is used to calculate the scaling factor to adjust the mapping function. In the slice-layer, when LMCS is enabled, the aps_id in a slice header is used to specify the luma mapping parameters contained in the adaptation parameter set (APS).

For an $i^{th}$ fragment (i∈[0, 15]), in the piecewise linear model, FwdMap, pivot points InputPivot[i] of the input and pivot points MappedPivot[i] of the output (mapping domain) are both defined. The InputPivot[i] and the MappedPivot[i] (for a 10-bit video) may be derived as follows:

$$OrgCW = 64; \quad (1)$$

$$InputPivot[i] = i * OrgCW; \text{ and} \quad (2)$$

$$MappedPivot[0] = 0, \quad (3)$$

$$MappedPivot[i + 1] = MappedPivot[i] + SignalledCW[i].$$

SignalledCW[i] is the number of codewords of the $i^{th}$ fragment. As can be seen from the logic framework of the LMCS shown in FIG. 1, for an inter-frame coding block, the motion compensation prediction is adopted in the raw domain, that is, after the motion compensation block $Y_{pred}$ is obtained through a reference decoded picture buffer (DPB), luma prediction blocks are mapped in the raw domain using the FwdMap function to obtain $Y'_{pred}$=FwdMap($Y_{pred}$). For an intra-frame prediction block, the FwdMap function is not applied because intra prediction is adapted in the mapping domain. After the reconstruction block $Y_r$ is calculated out, the luma value in the mapping domain is transformed and reconstructed into the luma value in the raw domain using the InvMap function, $\hat{Y}_i$=InvMap ($Y_r$). The inverse transformation function is applied to both intraframe and interframe coding luma blocks.

The luma mapping process (forward or reverse mapping) may be obtained by a look up table (LUT) or by on-the-fly computation. When the LUT is adopted, FwdMapLUT and InvMapLUT are pre-calculated and stored in a tile group layer, and forward mapping and reverse mapping are derived using the following formulas:

$$FwdMap(Y_{pred}) = FwdMapLUT[Y_{pred}], \text{ and}$$

$$InvMap(Y_r) = InvMapLUT[Y_r].$$

When the on-the-fly computation is adopted, taking the forward function FwdMap as an example, to calculate the fragment to which a luma sample belongs, the pixel value of the luma sample is shifted right by 6 bits (corresponding to 16 equal fragments, 2^6=64), to obtain the recovery value of the linear model parameter of the fragment, and the mapped luma value is obtained by on-the-fly computation. The computation process of the forward function is as follows:

$$FwdMap(Y_{pred}) = ((b2 - b1)/(a2 - a1)) * (Y_{pred} - a1) + b1.$$

In the above formula, a1=InputPivot[i], a2=InputPivot[i+ 1], b1=MappedPivot[i], and b2=MappedPivot[i+1].

The computation of the inverse function InvMap may be completed in a similar manner. In general, since various fragments in the mapping domain are different in size, comparison needs to be performed for the most straightforward inverse mapping process to determine which fragment the current pixel value belongs to, however, it would cause the complexity of the decoder to be increased. Therefore, a code stream constraint for the output pivot values MappedPivot[i] is adopted for Versatile Video Coding (VVC). Assuming that the range in the mapping domain (for a 10-bit video, the range is [0, 1023]) can be divided into 32 equal fragments, when MappedPivot[i] is not a multiple of 32, MappedPivot[i+1] and MappedPivot[i] do not belong to the same fragment among the 32 equal fragments (that is, MappedPivot[i+1]-MappedPivot[i] must be greater than or equal to 32). For example, the result of MappedPivot[i+1] >>(BitDepthY−5) is not equal to the result of MappedPivot [i]>>(BitDepthY−5). Due to the code stream constraint as described above, the InvMap function can be implemented by shifting right by 5 bits (corresponding to 32 equal fragments) to determine which fragment a pixel value belongs to.

The chroma residual scaling is used to compensate for the interaction between a luma signal and a chroma signal corresponding to this luma signal. Whether the chroma residual scaling is enabled is specified in the slice-layer. When the luma mapping is enabled, additional control identification information specifies whether the luma-dependent chroma residual scaling is enabled. When the luma mapping is not enabled, the luma-dependent chroma residual scaling is either not enabled. It is to be noted that the luma-dependent chroma residual scaling is always not enabled in a smaller coding chroma block.

The chroma residual scaling is dependent on the average pixel value of the neighborhood lumas reconstructed on the top and/or on the left of the current virtual pipeline data units (VPDUs). The VPDUs are defined as non-overlapping units in a picture. In the hardware decoding process, consecutive VPDUs are processed by multiple pipelines in parallel, and the size of the VPDU is roughly proportional to the size of buffers in most pipelines, so the size of the VPDU cannot be too large and is generally set to be the size of a transform block (TB). When the current coding unit is interframe 128×128, or, interframe 128×64 or 64× 128, the chroma residual scaling factor applied to the coding unit associated with a first VPDU may be applied to all chroma transform blocks in the coding unit. avgYr is defined as the average pixel value of the reconstructed neighborhood lumas. The value of $C_{ScaleInv}$ is derived through the following:

(1) the index $Y_{Idx}$ of the piecewise linear model to which avgYr belongs is obtained based on the InvMap function; and (2) $C_{ScaleInv}$=cScaleInv[$Y_{Idx}$], where cScaleInv[i] may be a LUT with 16 fragments which is pre-determined based on the values of SignalledCW[i] and the compensation value for an APS.

Different from the luma mapping which is executed on samples, $C_{ScaleInv}$ is a constant value for the entire chroma block, and according to $C_{ScaleInv}$, the chroma residual scaling can be applied as follows:

For the encoder end: $C_{ResScale} = C_{Res} * C_{Scale} = C_{Res}/C_{ScaleInv}$; and For the decoder end: $C_{Res} = C_{ResScale}/C_{Scale} = C_{ResScale} * C_{ScaleInv}$.

Figure 2:
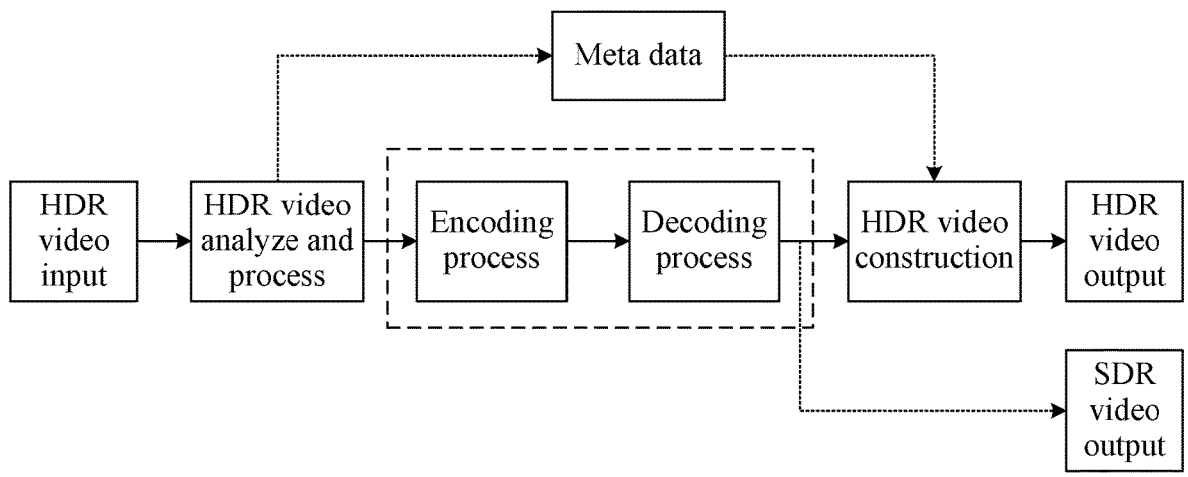
FIG. 2 is a schematic diagram of an out-loop encoding and decoding process according to an embodiment of the present application.

FIG. 2 is a schematic diagram of an out-loop encoding and decoding process according to an embodiment of the present application. With reference to FIG. 2, an inputted HDR video may be acquired, the HDR video is parsed and processed to generate meta data, the meta data may be sent to the decoder end for HDR video reconstruction, the HDR video may be encoded and decoded, and the decoded video may be outputted as a standard dynamic range (SDR) video.

Figure 3:
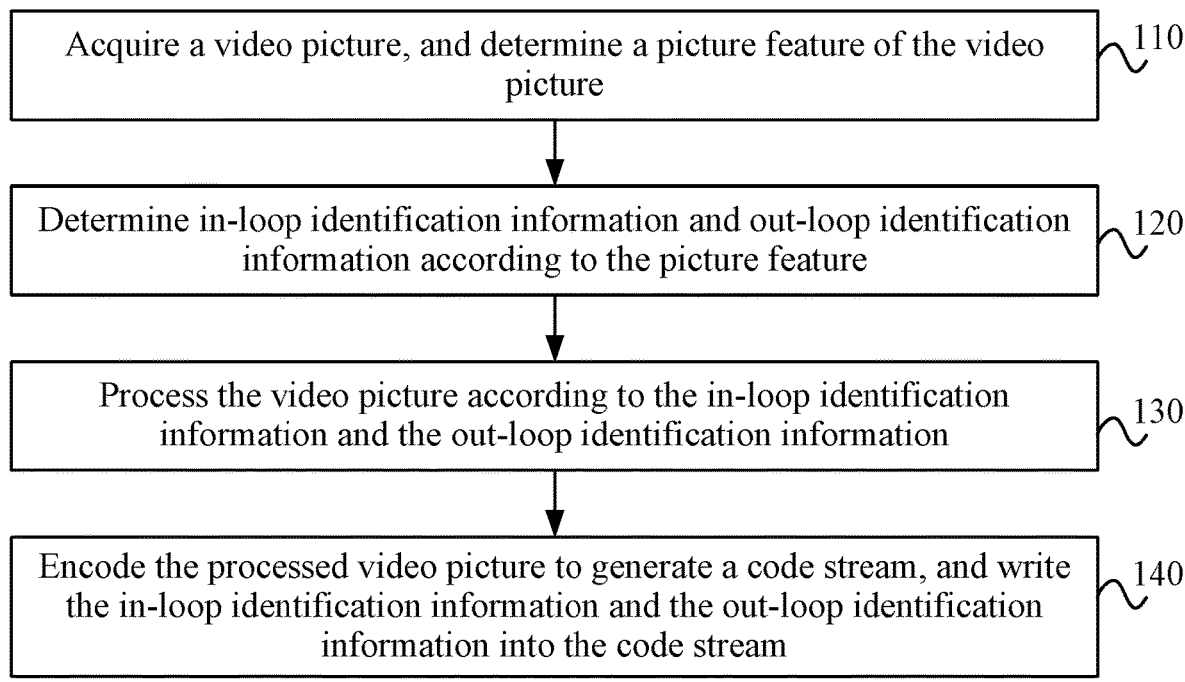
FIG. 3 is a flowchart of a picture encoding method according to an embodiment of the present application.

FIG. 3 is a flowchart of a picture encoding method according to an embodiment of the present application. The embodiment is applicable to the case of encoding a picture. The picture encoding method may be performed by a picture encoding apparatus in embodiments of the present application. The picture encoding apparatus may be implemented by software and/or hardware and may generally be integrated into a picture encoder. The picture encoding method in this embodiment of the present application specifically includes operations 110 to 140.

In the operation 110, a video picture is acquired, and a picture feature of the video picture is determined.

The video picture may be one or more frames of pictures in a video stream or a media file, the picture feature may be information of video picture features, and the picture feature may be used for determining the information for performing luma and chroma mapping transformation processing on the video picture.

In the embodiment of the present application, one or more frames of a picture in a video sequence may be acquired, and the picture feature of each frame of a video picture may be identified. For example, each frame of the video picture may be inputted into a pre-trained neural network model, and the picture feature corresponding to each frame of the video picture may be determined through the neural network model.

In the operation 120, in-loop identification information and out-loop identification information are determined according to the picture feature.

The in-loop identification information may be information for controlling to perform luma and chroma mapping transformation processing on the video picture inside an encoding and decoding loop, and the out-loop identification information may be information for controlling to perform luma and chroma mapping transformation processing on the video picture outside the encoding and decoding loop.

For example, whether luma and chroma mapping transformation processing needs to be performed inside the encoding and decoding loop and whether luma and chroma mapping transformation processing needs to be performed outside the encoding and decoding loop may be determined according to the picture feature, and corresponding in-loop identification information and out-loop identification information may be generated according to the determination result.

In the operation 130, the video picture is processed according to the in-loop identification information and the out-loop identification information.

In the embodiment of the present application, whether luma and chroma mapping transformation processing needs to be performed on the video picture outside the encoding and decoding loop and whether luma and chroma mapping transformation processing needs to be performed on the video picture inside the encoding and decoding loop may be determined according to the in-loop identification information and the out-loop identification information, and the luma and chroma mapping transformation processing is sequentially performed on the video picture outside the encoding and decoding loop and inside the encoding and decoding loop according to the corresponding determination result.

In the operation 140, the processed video picture is encoded to generate a code stream, and the in-loop identification information and the out-loop identification information are written into the code stream.

The code stream may be a data stream obtained after the video picture is encoded.

For example, the video picture obtained after luma and chroma mapping transformation may be encoded, the video picture may be encoded into a data stream, and the determined in-loop identification information and out-loop identification information may be added to the data stream. The encoded code stream is sent to achieve the transmission of the video picture.

In the embodiment of the present application, a picture feature of an acquired video picture is determined, in-loop identification information and out-loop identification information are generated using the picture feature, the video picture is processed according to the in-loop identification information and the out-loop identification information, the processed video picture is encoded into a code stream, and the generated in-loop identification information and out-loop identification information are added to the code stream. In this manner, the combination of out-loop and in-loop luma and chroma mapping transformation is achieved, thereby improving the video picture encoding performance.

In an embodiment, on the basis of the aforementioned embodiment of the present application, the picture feature includes at least one of the following: a luma dynamic range, a color space, texture information, a shape feature or a spatial relationship.

In the embodiment of the present application, the luma dynamic range may be a range from a minimum value of luma in the video picture to a maximum value of luma in the video picture, the color space may be a color range covered by picture colors in the video picture, the texture information may be spatial arrangement information of quantized colors or intensities in the video picture, the shape feature may be a contour and a region feature of an object in the video picture, and the spatial relationship may be a spatial positional relationship or a relative direction relationship between multiple segmentable objects in the video picture.

In an embodiment, on the basis of the aforementioned embodiments of the present application, the in-loop identification information and/or the out-loop identification information are carried in at least one of the following: network abstraction layer (NAL) unit header information, a sequence-layer parameter set (SPS), a picture-layer parameter set (PPS), a slice-layer parameter set, supplemental enhancement information (SEI), video useability information or customized unit information.

For example, the generated in-loop identification information and out-loop identification information may be added to the NAL unit header information, the SPS, the PPS, the slice-layer parameter set, the SEI and the video useability information of the code stream of the video picture, and may also be written into new unit information in the code stream, where the unit may be generated customized information unit.

Figure 4:
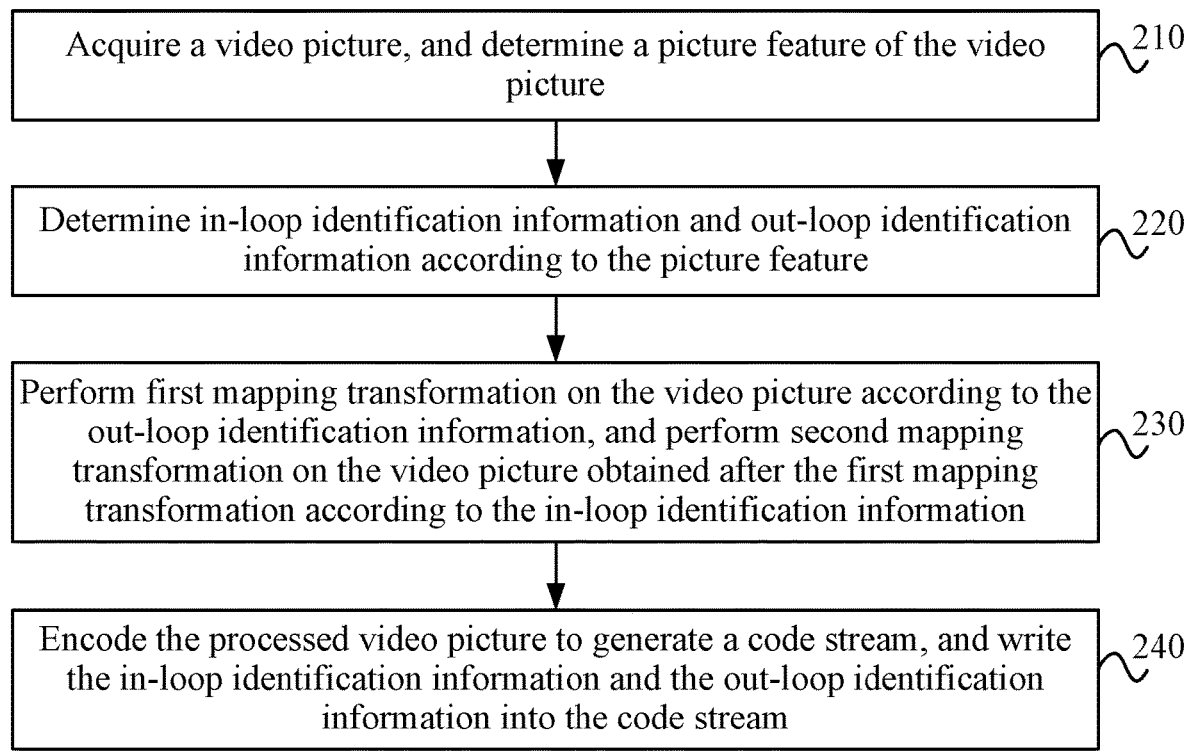
FIG. 4 is another flowchart of a picture encoding method according to an embodiment of the present application.

FIG. 4 is another flowchart of a picture encoding method according to an embodiment of the present application. The embodiment of the present application is embodied on the basis of the aforementioned embodiments of the present application. With reference to FIG. 4, the picture encoding method provided in the embodiment of the present application specifically includes operations 210 to 240.

In the operation 210, a video picture is acquired, and a picture feature of the video picture is determined.

In the operation 220, in-loop identification information and out-loop identification information are determined according to the picture feature.

In the operation 230, first mapping transformation is performed on the video picture according to the out-loop identification information, and second mapping transformation is performed on the video picture obtained after the first mapping transformation according to the in-loop identification information.

In the embodiment of the present application, whether to perform the first mapping transformation outside an encoding loop may be determined according to the out-loop identification information, and whether the second mapping transformation needs to be performed on the video picture inside the encoding loop may be determined according to the in-loop identification information. When the first mapping transformation is determined to be performed on the video picture using the out-loop identification information, the first mapping transformation processing is performed on the video picture outside the encoding loop according to a control parameter in the out-loop identification information, and when the second mapping transformation is determined to be performed on the video picture according to the in-loop identification information, the second mapping transformation processing is performed on the video picture obtained after the first mapping transformation processing inside the encoding loop.

In the operation 240, the processed video picture is encoded to generate a code stream, and the in-loop identification information and the out-loop identification information are written into the code stream.

Figure 5:
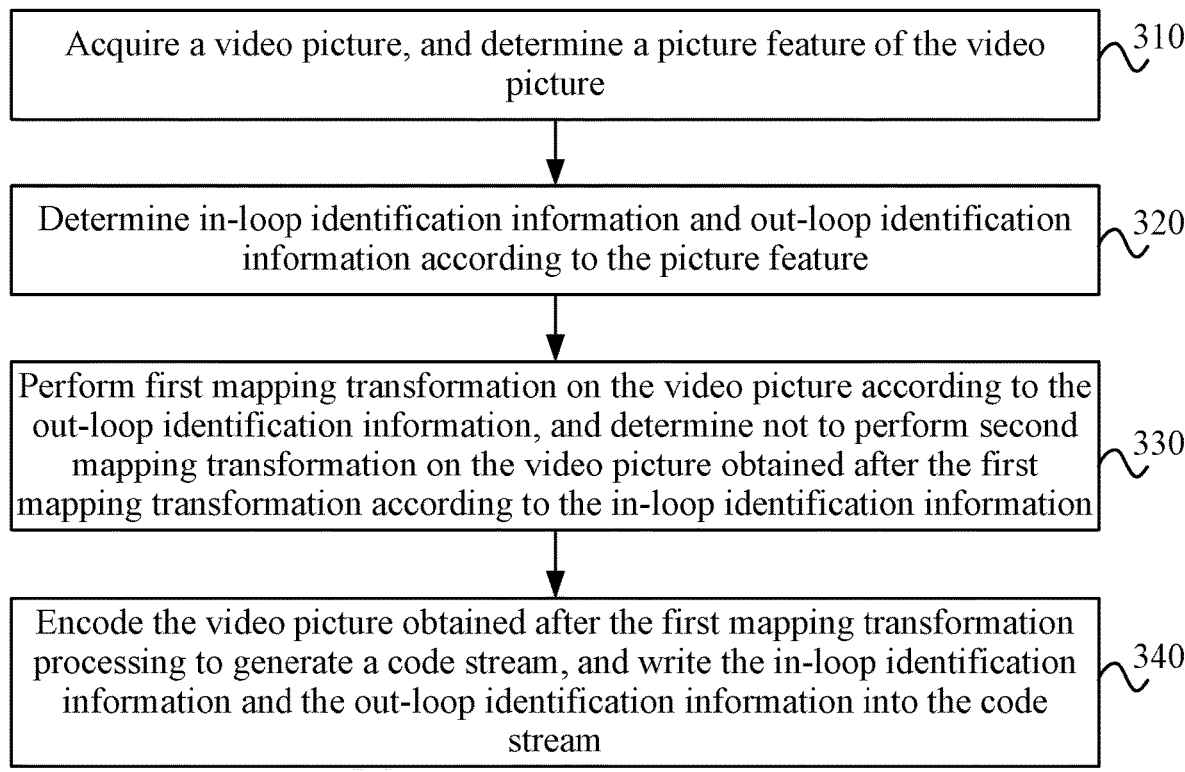
FIG. 5 is another flowchart of a picture encoding method according to an embodiment of the present application.

FIG. 5 is another flowchart of a picture encoding method according to an embodiment of the present application. The embodiment of the present application is embodied on the basis of the aforementioned embodiments of the present application. With reference to FIG. 5, the picture encoding method provided in the embodiment of the present application specifically includes operations 310 to 340.

In the operation 310, a video picture is acquired, and a picture feature of the video picture is determined.

In the operation 320, in-loop identification information and out-loop identification information are determined according to the picture feature.

In the operation 330, first mapping transformation is performed on the video picture according to the out-loop identification information, and second mapping transformation is determined not to be performed on the video picture obtained after the first mapping transformation according to the in-loop identification information.

In the embodiment of the present application, whether to perform the first mapping transformation outside an encoding loop may be determined according to the out-loop identification information, and whether the second mapping transformation needs to be performed on the video picture inside the encoding loop may be determined according to the in-loop identification information. When the first mapping transformation is determined to be performed on the video picture using the out-loop identification information, the first mapping transformation processing is performed on the video picture outside the encoding loop according to a control parameter in the out-loop identification information, and when the second mapping transformation is determined not to be performed on the video picture according to the in-loop identification information, the second mapping transformation processing is not performed on the video picture obtained after the first mapping transformation processing inside the encoding loop.

In the operation 340, the video picture obtained after the first mapping transformation processing is encoded to generate a code stream, and the in-loop identification information and the out-loop identification information are written into the code stream.

Figure 6:
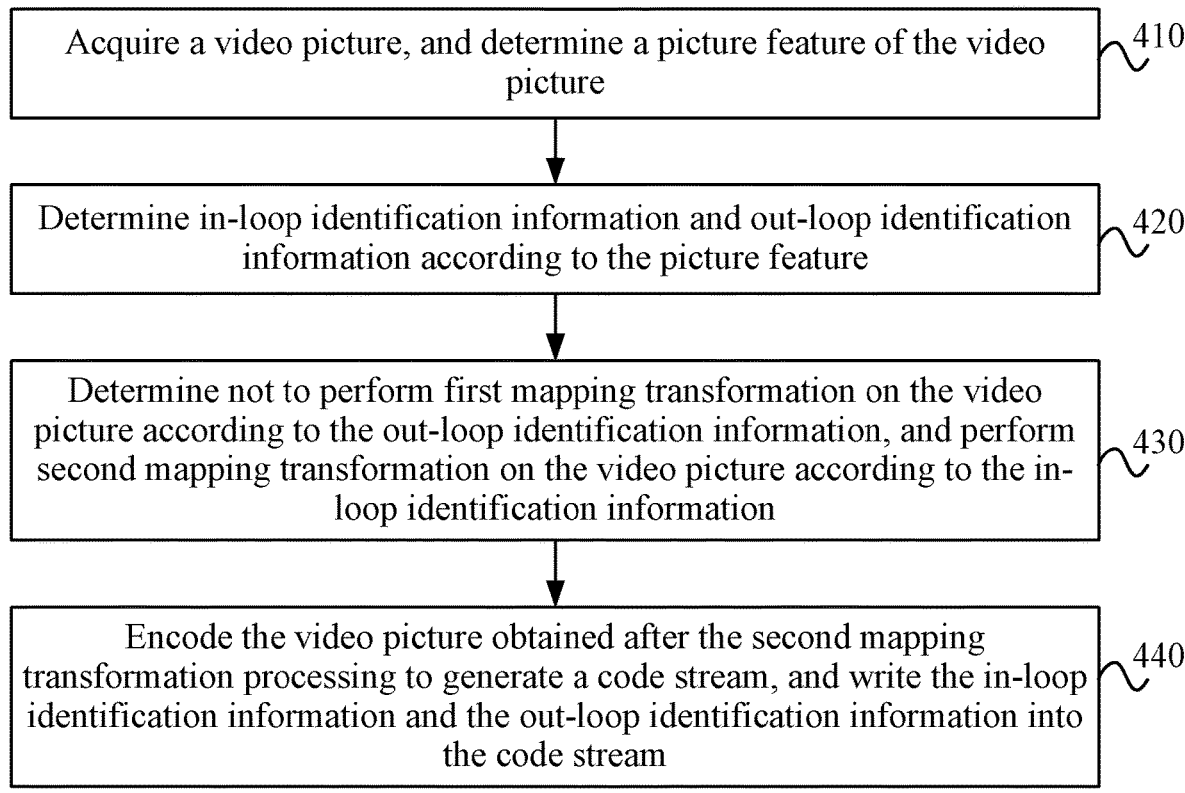
FIG. 6 is another flowchart of a picture encoding method according to an embodiment of the present application.

FIG. 6 is another flowchart of a picture encoding method according to an embodiment of the present application. This embodiment of the present application is embodied on the basis of the aforementioned embodiments of the present application. With reference to FIG. 6, the method provided in this embodiment of the present application specifically includes operations 410 to 440.

In the operation 410, a video picture is acquired, and a picture feature of the video picture is determined.

In the operation 420, in-loop identification information and out-loop identification information are determined according to the picture feature.

In the operation 430, first mapping transformation is determined not to be performed on the video picture according to the out-loop identification information, and second mapping transformation is performed on the video picture according to the in-loop identification information.

In the embodiment of the present application, whether to perform the first mapping transformation outside an encoding loop may be determined according to the out-loop identification information, and whether the second mapping transformation needs to be performed on the video picture inside the encoding loop may be determined according to the in-loop identification information. The first mapping transformation may be determined not to be performed on the video picture outside the encoding loop according to the out-loop identification information, and when the second mapping transformation is determined to be performed on the video picture inside the encoding loop according to the in-loop identification information, the second mapping transformation processing is performed on the video picture inside the encoding loop using a control parameter in the in-loop identification information.

In the operation 440, the video picture obtained after the second mapping transformation processing is encoded to generate a code stream, and the in-loop identification information and the out-loop identification information are written into the code stream.

Figure 7:
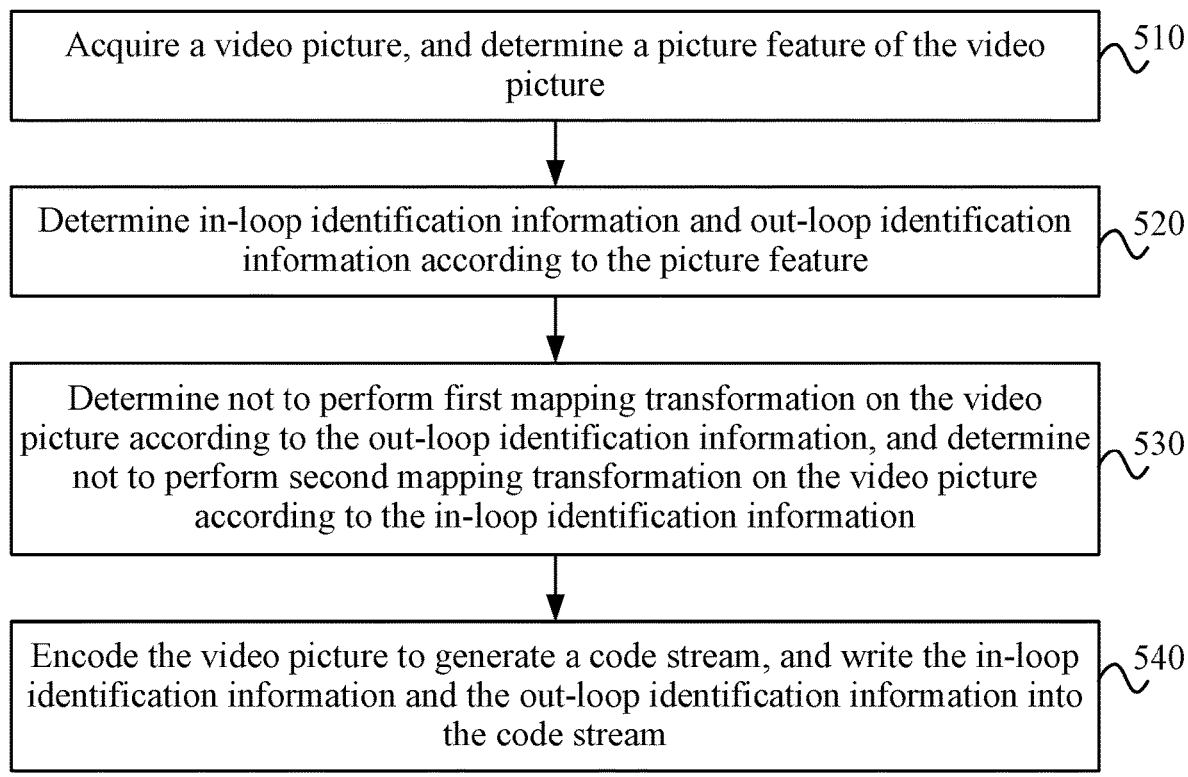
FIG. 7 is another flowchart of a picture encoding method according to an embodiment of the present application.

FIG. 7 is another flowchart of a picture encoding method according to an embodiment of the present application. This embodiment of the present application is embodied on the basis of the aforementioned embodiments of the present application. With reference to FIG. 7, the method provided in this embodiment of the present application specifically includes operations 510 to 540.

In the operation 510, a video picture is acquired, and a picture feature of the video picture is determined.

In the operation 520, in-loop identification information and out-loop identification information are determined according to the picture feature.

In the operation 530, first mapping transformation is determined not to be performed on the video picture according to the out-loop identification information, and second mapping transformation is determined not to be performed on the video picture according to the in-loop identification information.

For example, whether to perform the first mapping transformation outside an encoding loop may be determined according to the out-loop identification information, whether to perform the second mapping transformation inside the encoding loop may be determined according to the in-loop identification information, and neither the first mapping transformation nor the second mapping transformation may be determined to be performed on the video picture.

In the operation 540, the video picture is encoded to generate a code stream, and the in-loop identification information and the out-loop identification information are written into the code stream.

In an embodiment, on the basis of the aforementioned embodiments of the present application, the first mapping transformation and the second mapping transformation include luma mapping transformation and chroma mapping transformation, respectively, where the luma mapping transformation includes luma component value mapping, the luma component value mapping is used for altering a luma dynamic range, and the chroma mapping transformation includes chroma component value mapping or chroma scaling processing dependent on the luma mapping transformation.

In an embodiment, the first mapping transformation and the second mapping transformation may each include luma mapping transformation and chroma mapping transformation, the luma mapping transformation includes luma component value mapping, the luma component value mapping is used for altering a luma dynamic range, and the chroma mapping transformation includes chroma component value mapping or chroma scaling processing dependent on the luma mapping transformation. For example, the first mapping transformation may be reshaper-based mapping transformation, and the second mapping transformation may be LMCS-based mapping transformation.

In an embodiment, on the basis of the aforementioned embodiments of the present application, the in-loop identification information and/or the out-loop identification information include control information and parameter information, where the control information is carried in at least one of the following: NAL unit header information, an SPS, a PPS, a slice-layer parameter set, an SEI, video useability information or customized unit information, and the parameter information in the code stream is carried in at least one of the following: an APS, an SEI or a customized NAL unit.

In the embodiment of the present application, the in-loop identification information and the out-loop identification information may consist of control information and parameter information, where the control information may be the information that can control whether to perform the first mapping transformation or the second mapping transformation and may specifically be carried in one or more of NAL unit header information, an SPS, a PPS, a slice-layer parameter set, an SEI, video useability information or customized unit information, and the parameter information may be the parameter information used for the first mapping transformation or the second mapping transformation and may be carried in one or more of an APS, an SEI or a customized NAL unit.

In an embodiment, on the basis of the aforementioned embodiments of the present application, the parameter information of the in-loop identification information in the code stream and the parameter information of the out-loop identification information in the code stream are carried in one of the following manners.

The parameter information of the in-loop identification information and the parameter information of the out-loop identification information are each carried in a data packet oriented to luma and chroma mapping transformation in the APS.

The in-loop identification information is carried in a data packet oriented to luma and chroma mapping transformation in the APS, and the out-loop identification information is carried in a data packet of a custom SEI.

The parameter information of the in-loop identification information and the parameter information of the out-loop identification information are each carried in a data packet oriented to luma and chroma mapping transformation in the customized NAL unit.

In the embodiment of the present application, the parameter information of the in-loop identification information and the parameter information of the out-loop identification information may be written into a data packet oriented to luma and chroma mapping transformation in the APS of the code stream; or the in-loop identification information may be written into a data packet oriented to luma and chroma mapping transformation in the APS of the code stream, and the out-loop identification information may be written into a data packet of a custom SEI; or, the parameter information of the in-loop identification information and the parameter information of the out-loop identification information may be written into a data packet oriented to luma and chroma mapping transformation in the customized NAL unit of the code stream.

Figure 8:
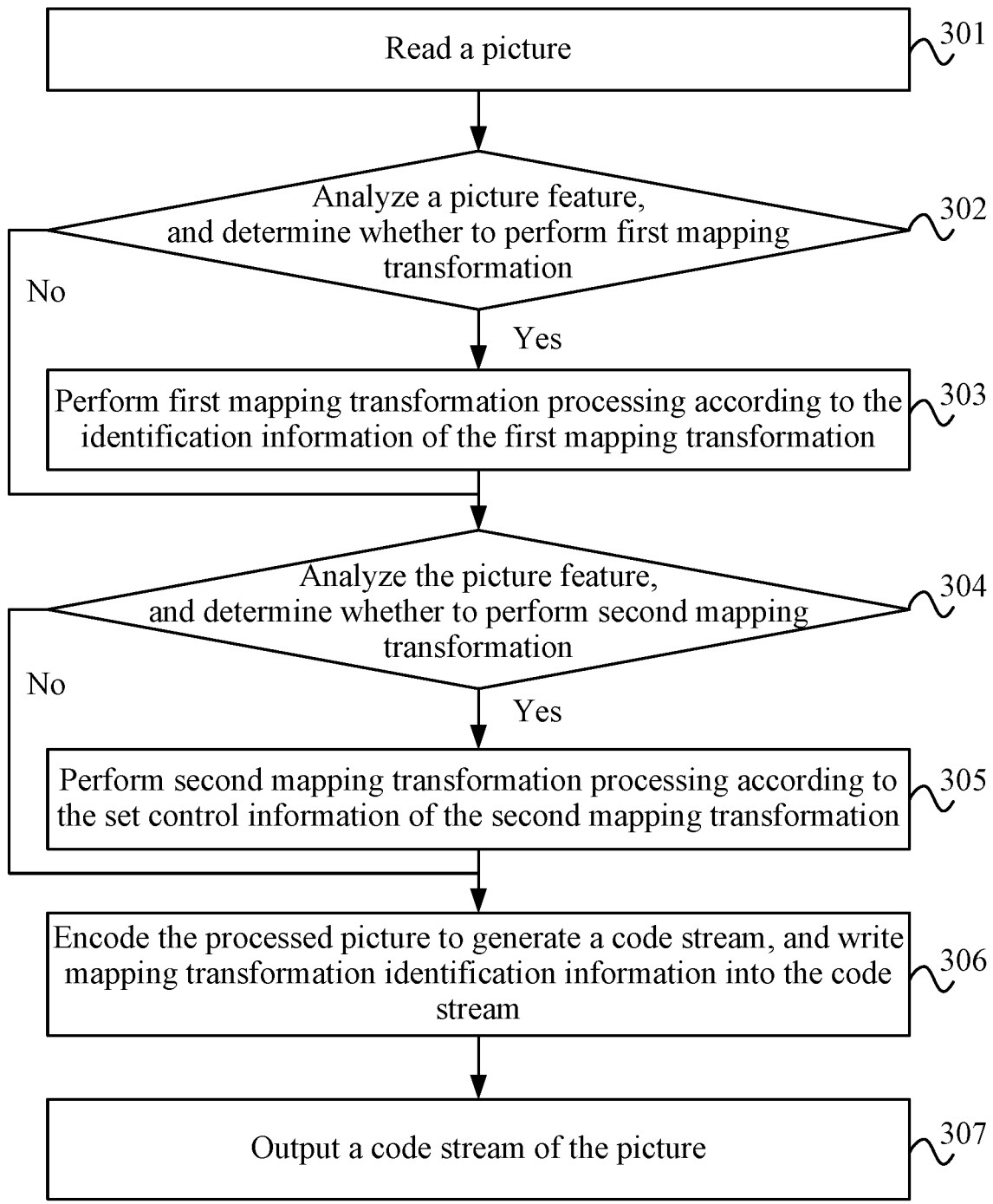
FIG. 8 is an example diagram of a picture encoding method according to an embodiment of the present application.

FIG. 8 is an example diagram of a picture encoding method according to an embodiment of the present application. With reference to FIG. 8, this embodiment provides a video encoding method applied to an apparatus for encoding a video. The input of this apparatus is a picture contained in a video, and the output of this apparatus is a picture code stream, a transport stream containing the picture code stream, or a media file containing the picture code stream.

In the operation 301, a picture is read, where the picture is one frame in a video sequence.

In the operation 302, the picture feature is analyzed, where the picture feature includes, but is not limited to, a luma dynamic range, a color space, texture information, a shape feature and a spatial relationship. According to the aforementioned information, whether to perform first mapping transformation is determined and the control information of the first mapping transformation is set.

The luma dynamic range refers to a range from a minimum value of luma to a maximum value of luma, the color space refers to a color range covered by the colors in the picture, the texture information refers to information on the spatial arrangement of quantized colors or intensities in the picture, the shape feature refers to a contour and a region feature of an object in the picture, and the spatial relationship refers to a spatial positional relationship or a relative direction relationship between multiple segmentable objects in the picture.

The control information of the first mapping transformation is used for indicating whether to perform the first mapping transformation.

In the operation 303, first mapping transformation processing is performed outside an encoding loop according to the identification information of the first mapping transformation.

The identification information of the first mapping transformation includes control information of the first mapping transformation and the parameter information of the first mapping transformation, the control information of the first mapping transformation is set in the operation 302 for identifying the enablement of the first mapping transformation, and the parameter information of the first mapping transformation includes parameters for the first mapping transformation process.

In the operation 304, a picture feature of a picture entering the encoding loop is analyzed, where the picture feature includes, but is not limited to, a luma dynamic range, a color space, texture information, a shape feature and a spatial relationship. According to the aforementioned information, whether to perform second mapping transformation is determined and the control information of the second mapping transformation is set.

The picture entering the encoding loop includes a picture obtained after the first mapping transformation processing or a picture on which the first mapping transformation is not performed.

The luma dynamic range refers to a range from a minimum value of luma to a maximum value of luma, the color space refers to a color range covered by the colors in the picture, the texture information refers to information on the spatial arrangement of quantized colors or intensities in the picture, the shape feature refers to a contour and a region feature of an object in the picture, and the spatial relationship refers to a spatial positional relationship or a relative direction relationship between multiple segmentable objects in the picture.

The control information of the second mapping transformation is used for indicating whether to perform the second mapping transformation.

In the operation 305, second mapping transformation processing is performed inside the encoding loop according to the set control information of the second mapping transformation.

The identification information of the second mapping transformation includes control information of the second mapping transformation and the parameter information of the second mapping transformation, the control information of the second mapping transformation is set in the operation 304 for identifying the enablement of the second mapping transformation, and the parameter information of the second mapping transformation includes parameters for the second mapping transformation process.

In the operation 306, the processed picture is encoded to generate a code stream, and the identification information of the first mapping transformation and the identification information of the second mapping transformation are written into the code stream, where the identification information is carried in all or part of the following: NAL unit header information, an SPS, a PPS, a slice-layer parameter set, an SEI or video useability information, or the identification information is taken as a new information unit.

The processed picture refers to a picture on which at least one of a conventional encoding process, first mapping transformation, or, second mapping transformation are performed, where the conventional encoding process herein includes blocking, transformation and quantization, intraframe/interframe prediction and other processing processes.

In the operation 307, a picture code stream, a transport stream containing the picture code stream, or a media file containing the picture code stream is outputted.

Figure 9:
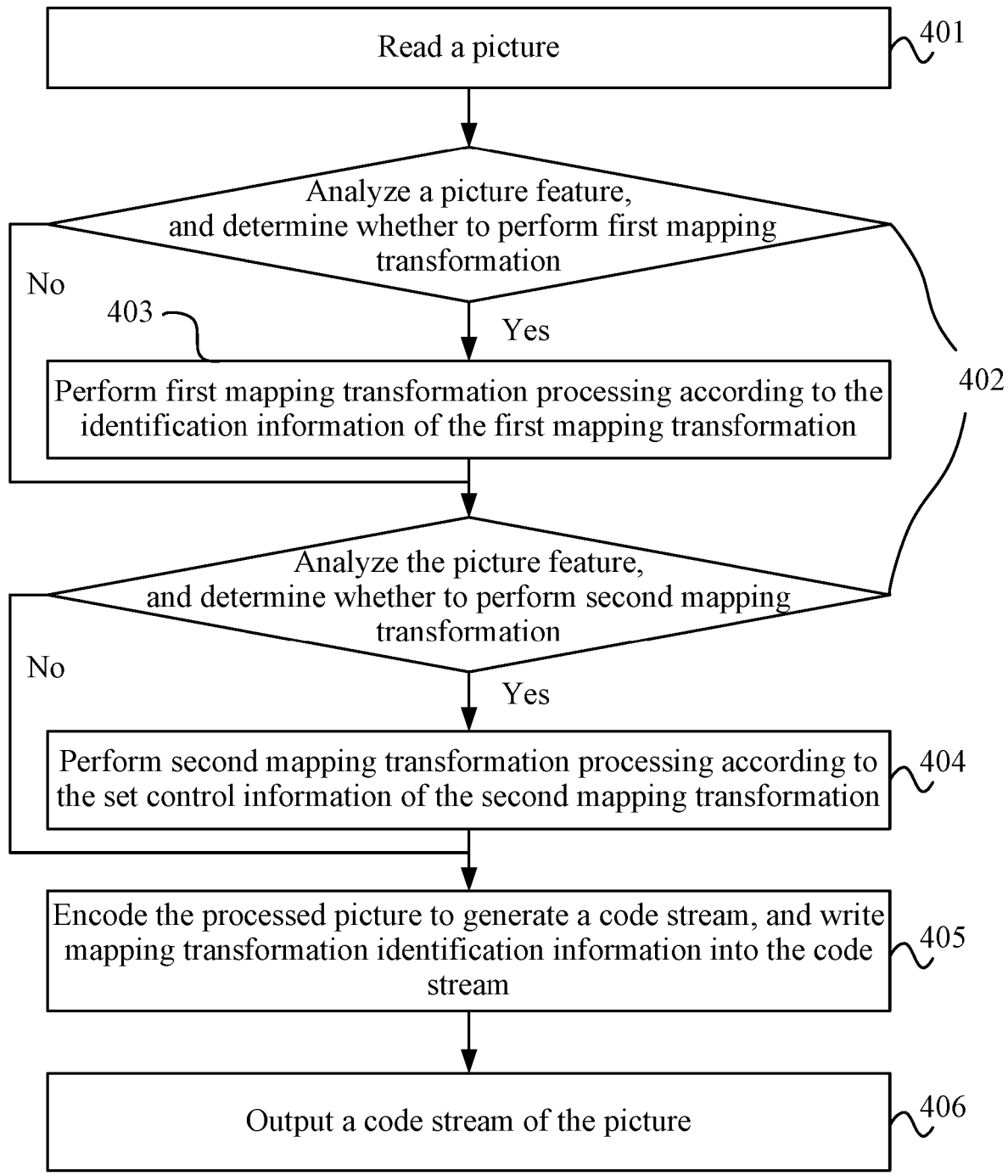
FIG. 9 is another example diagram of a picture encoding method according to an embodiment of the present application.

FIG. 9 is another example diagram of a picture encoding method according to an embodiment of the present application. With reference to FIG. 9, the embodiment provides a video encoding method applied to an apparatus for encoding a video. The input of this apparatus is a picture contained in a video, and the output of this apparatus is a picture code stream, a transport stream containing the picture code stream, or a media file containing the picture code stream.

In the operation 401, a picture is read, where the picture is one frame in a video sequence.

In the operation 402, the picture feature of the picture is analyzed, where the picture feature includes, but is not limited to, a luma dynamic range, a color space, texture information, a shape feature and a spatial relationship. According to the aforementioned information, whether to perform first mapping transformation and second mapping transformation is determined and the control information of the first mapping transformation and the control information of the second mapping transformation are set.

The luma dynamic range refers to a range from a minimum value of luma to a maximum value of luma, the color space refers to a color range covered by the colors in the picture, the texture information refers to information on the spatial arrangement of quantized colors or intensities in the picture, the shape feature refers to a contour and a region feature of an object in the picture, and the spatial relationship refers to a spatial positional relationship or a relative direction relationship between multiple segmentable objects in the picture.

The control information of the first mapping transformation is used for indicating whether to perform the first mapping transformation, and the control information of the second mapping transformation is used for indicating whether to perform the second mapping transformation.

In the operation 403, first mapping transformation processing is performed outside an encoding loop according to the identification information of the first mapping transformation.

The identification information of the first mapping transformation includes control information of the first mapping transformation and the parameter information of the first mapping transformation. The control information of the first mapping transformation is set in the operation 402 for identifying the enablement of the first mapping transformation, and the parameter information of the first mapping transformation includes parameters for the first mapping transformation process.

In the operation 404, second mapping transformation processing is performed inside the encoding loop according to the set control information of the second mapping transformation.

The identification information of the second mapping transformation includes control information of the second mapping transformation and the parameter information of the second mapping transformation, the control information of the second mapping transformation is set in the operation 402 for identifying the enablement of the second mapping transformation, and the parameter information of the second mapping transformation includes parameters for the second mapping transformation process.

In the operation 405, the processed picture is encoded to generate a code stream, and the identification information of the first mapping transformation and the identification information of the second mapping transformation are written into the code stream, where the identification information is carried in all or part of the following: NAL unit header information, an SPS, a PPS, a slice-layer parameter set, an SEI or video useability information, or the identification information is taken as a new information unit.

The processed picture refers to a picture on which at least one of a conventional encoding process, first mapping transformation, or, second mapping transformation are performed, where the conventional encoding process herein includes blocking, transformation and quantization, intraframe/interframe prediction and other processing processes.

In the operation 406, a picture code stream, a transport stream containing the picture code stream, or, a media file containing the picture code stream is outputted.

In an example embodiment, the first mapping transformation and the second mapping transformation are both implementations of luma and chroma mapping transformation. One implementation of the luma mapping transformation is linear or non-linear mapping of luma component values to reduce or enlarge the luma dynamic range. The implementation of the chroma mapping transformation includes linear or non-linear mapping of chroma component values or chroma scaling processing dependent on the luma mapping transformation.

Figure 10:
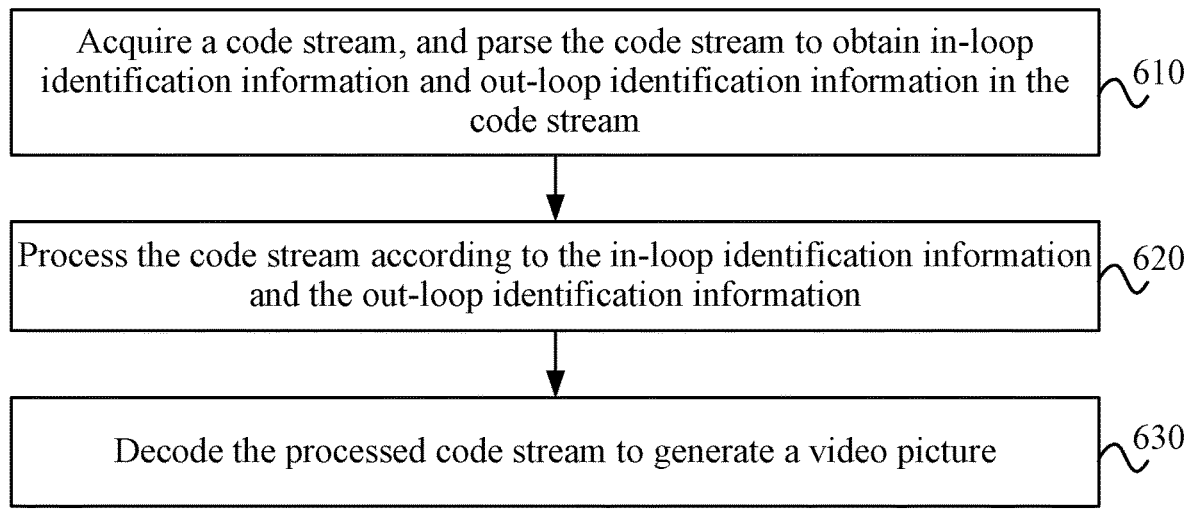
FIG. 10 is a flowchart of a picture decoding method according to an embodiment of the present application.

FIG. 10 is a flowchart of a picture decoding method according to an embodiment of the present application. The embodiment is applicable to the case of decoding a picture in a picture video transmission process. The picture decoding method may be performed by a picture decoding apparatus in embodiments of the present application. The picture decoding apparatus may be implemented by software and/or hardware and may generally be integrated into a picture decoder. The picture decoding method in the embodiment of the present application specifically includes operations 610 to 630.

In the operation 610, a code stream is acquired, and the code stream is parsed to obtain in-loop identification information and out-loop identification information in the code stream.

The code stream may be a data stream obtained after the video picture is encoded and may be generated by a picture encoding apparatus and sent to a picture decoding apparatus.

In the embodiment of the present application, the picture decoding apparatus may receive the transmitted code stream and extract in-loop identification information and out-loop identification information from the code stream, where the in-loop identification information may be information for controlling performing luma and chroma mapping transformation processing on the video picture inside an encoding and decoding loop, and the out-loop identification information may be information for controlling performing luma and chroma mapping transformation processing on the video picture outside the encoding and decoding loop.

In the operation 620, the code stream is processed according to the in-loop identification information and the out-loop identification information.

For example, whether luma and chroma mapping transformation processing needs to be performed on the code stream inside a decoding loop and whether luma and chroma mapping transformation processing needs to be performed on the code stream outside the decoding loop may be determined according to the in-loop identification information and the out-loop identification information, and the luma and chroma mapping transformation processing is sequentially performed on the code stream outside the decoding loop and inside the decoding loop according to the corresponding determination result. It is to be understood that the processing in the picture decoding apparatus may be the inverse processing operations of the processing in the picture encoding apparatus.

In the operation 630, the processed code stream is decoded to generate a video picture.

In the embodiment of the present application, the received code stream may be decoded according to a video decoding algorithm to acquire a decoded video picture, and the decoded video picture may be sent to a display interface for display. It is to be understood that the decoding process of the code stream may be performed according to a decoding process in the related art, and the decoding process of the code stream may correspond to an encoding process of the video picture in a video encoding apparatus.

In the embodiment of the present application, a code stream is received, out-loop identification information and in-loop identification information carried in the code stream are extracted, the received code stream is processed according to the out-loop identification information and the in-loop identification information, and the code stream is decoded into a video picture. In this manner, the combination of out-loop and in-loop luma and chroma mapping transformation is achieved, thereby improving the quality of the decoded video picture.

In an embodiment, on the basis of the aforementioned embodiments of the present application, the in-loop identification information and/or the out-loop identification information are carried in at least one of the following: NAL unit header information, an SPS, a PPS, a slice-layer parameter set, an SEI, video useability information or customized unit information.

In an embodiment, on the basis of the aforementioned embodiments of the present application, the operation in which the code stream is processed according to the in-loop identification information and the out-loop identification information includes one of the following operations.

Fourth mapping transformation is performed on the code stream according to the in-loop identification information, and third mapping transformation is performed on the code stream obtained after the fourth mapping transformation according to the out-loop identification information.

Fourth mapping transformation is performed on the code stream according to the in-loop identification information, and third mapping transformation is determined not to be performed on the code stream obtained after the fourth mapping transformation according to the out-loop identification information.

Fourth mapping transformation is determined not to be performed on the code stream according to the in-loop identification information, and third mapping transformation is performed on the code stream according to the out-loop identification information.

Fourth mapping transformation is determined not to be performed on the code stream according to the in-loop identification information, and third mapping transformation is determined not to be performed on the code stream according to the out-loop identification information.

The third mapping transformation and the fourth mapping transformation may be processing of luma and chroma mapping transformation. The third mapping transformation may be the inverse transformation of the first mapping transformation in the video encoding apparatus, and the fourth mapping transformation may be the inverse transformation of the second mapping transformation in the video encoding apparatus. For example, the fourth mapping transformation may be LMCS-based mapping transformation, and the third mapping transformation may be reshaper-based mapping transformation.

In the embodiment of the present application, whether to perform the fourth mapping transformation on the code stream inside the decoding loop may be determined according to the in-loop identification information, and whether the third mapping transformation needs to be performed on the code stream outside the decoding loop may be determined according to the out-loop identification information. The fourth mapping transformation is performed on the code stream inside the decoding loop, and the third mapping transformation is performed on the code stream obtained after the fourth mapping transformation outside the decoding loop; or the fourth mapping transformation is performed on the code stream inside the decoding loop, and the third mapping transformation is not performed on the code stream obtained after the fourth mapping transformation outside the decoding loop; or the fourth mapping transformation is not performed on the code stream inside the decoding loop, and the third mapping transformation is performed on the code stream outside the decoding loop; or the fourth mapping transformation is not performed on the code stream inside the decoding loop, and the third mapping transformation is not performed on the code stream outside the decoding loop.

In an embodiment, on the basis of the aforementioned embodiments of the present application, the third mapping transformation and the fourth mapping transformation include luma mapping transformation and chroma mapping transformation, respectively, where the luma mapping transformation includes luma component value mapping, the luma component value mapping is used for altering a luma dynamic range, and the chroma mapping transformation includes chroma component value mapping or chroma scaling processing dependent on the luma mapping transformation.

In an embodiment, on the basis of the aforementioned embodiments of the present application, the in-loop identification information and/or the out-loop identification information include control information and parameter information, where the control information is carried in at least one of the following: NAL unit header information, an SPS, a PPS, a slice-layer parameter set, an SEI, video useability information or customized unit information, and the parameter information in the code stream is carried in at least one of the following: an APS, an SEI or a customized NAL unit.

In an embodiment, on the basis of the aforementioned embodiments of the present application, the parameter information of the in-loop identification information in the code stream and the parameter information of the out-loop identification information in the code stream are carried in one of the following manners.

The parameter information of the in-loop identification information and the parameter information of the out-loop identification information are each carried in a data packet oriented to luma and chroma mapping transformation in the APS.

The in-loop identification information is carried in a data packet oriented to luma and chroma mapping transformation in the APS, and the out-loop identification information is carried in a data packet of a custom SEI.

The parameter information of the in-loop identification information and the parameter information of the out-loop identification information are each carried in a data packet oriented to luma and chroma mapping transformation in the customized NAL unit.

Figure 11:
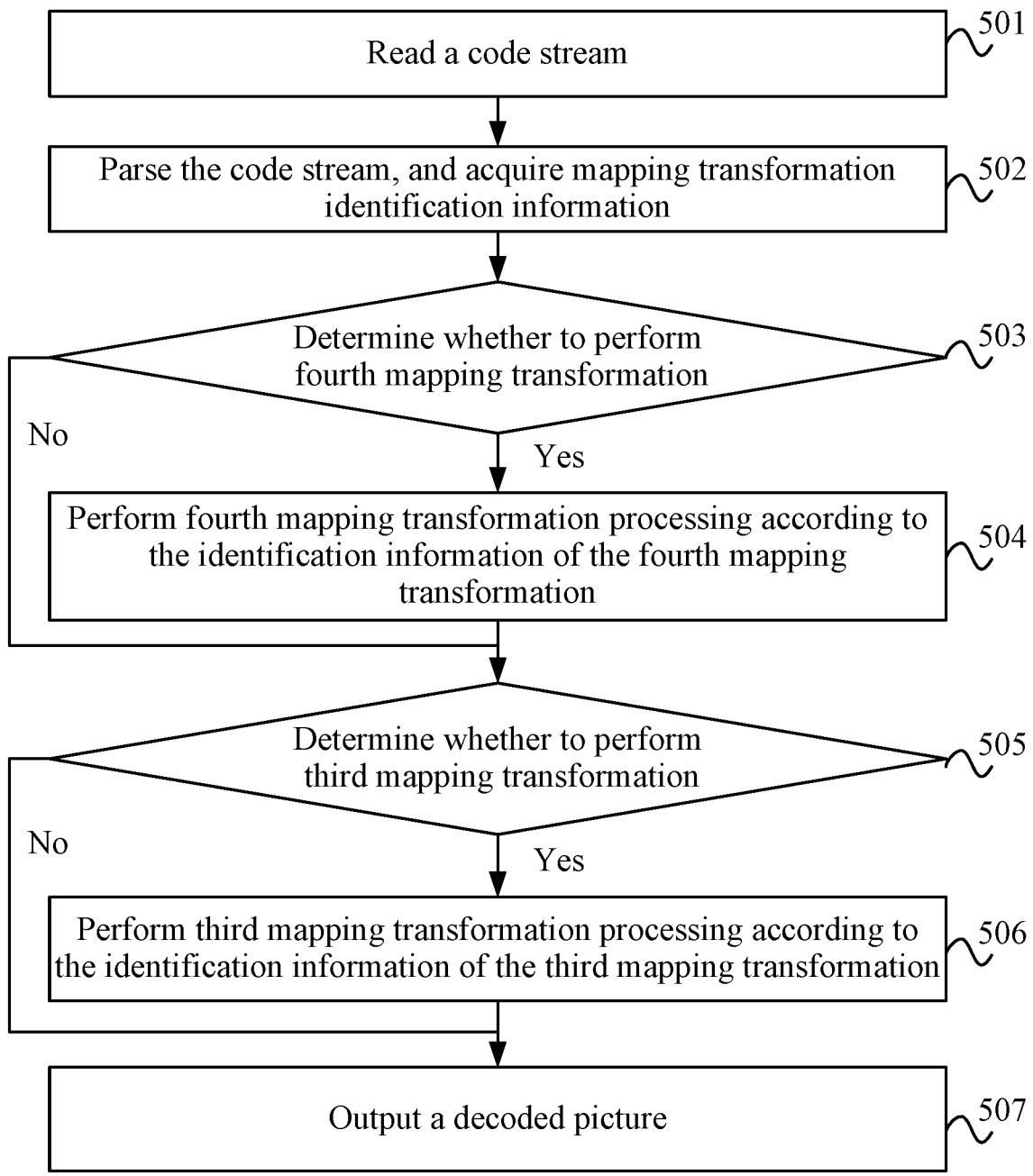
FIG. 11 is an example diagram of a picture decoding method according to an embodiment of the present application.

FIG. 11 is an example diagram of a picture decoding method according to an embodiment of the present application. With reference to FIG. 11, in an example embodiment, the embodiment is a video decoding method applied to an apparatus for decoding a video code stream. The input of the apparatus is a picture code stream, a transport stream containing the picture code stream, or, a media file containing the picture code stream, and the output is a picture consisting of a video.

In the operation 501, a code stream is read.

In the operation 502, the code stream is parsed, and identification information of mapping transformation is acquired, where the identification information of mapping transformation includes identification information of third mapping transformation and identification information of the fourth mapping transformation.

The identification information of the third mapping transformation includes control information of the third mapping transformation and the parameter information of the third mapping transformation, the control information of the third mapping transformation is used for identifying the enablement of the third mapping transformation, and the parameter information of the third mapping transformation includes parameters for the third mapping transformation process.

The identification information of the fourth mapping transformation includes control information of the fourth mapping transformation and the parameter information of the fourth mapping transformation, the control information of the fourth mapping transformation is used for identifying the enablement of the fourth mapping transformation, and the parameter information of the fourth mapping transformation includes parameters for the fourth mapping transformation process.

In the operation 503, whether to perform the fourth mapping transformation is determined according to the identification information of the fourth mapping transformation.

In the operation 504, the fourth mapping transformation is performed inside a decoding loop according to the identification information of the fourth mapping transformation.

The fourth mapping transformation is the inverse processing process corresponding to that in the operation 305 in the aforementioned embodiment.

In the operation 505, whether to perform the third mapping transformation is determined according to the identification information of the third mapping transformation.

In the operation 506, third mapping transformation processing is performed outside the decoding loop according to the identification information of the third mapping transformation.

The third mapping transformation is the inverse processing process corresponding to that in the operation 303 in the aforementioned embodiment.

In the operation 507, a decoded picture is outputted.

In an embodiment, on the basis of the aforementioned embodiments of the present application, the syntax and semantics of in-loop and out-loop luma and chroma mapping transformation in the sequence layer, the picture layer and the slice-layer are given.

Table 1 shows the identification information for the luma and chroma mapping transformation carried in the SPS in the code stream described in the aforementioned embodiments.

sps_mtlc_in_loop_enabled_flag is the control information for enabling the in-loop luma and chroma mapping transformation in the sequence layer. When sps_mtlc_in_loop_enabled_flag is equal to 1, the in-loop luma and chroma mapping transformation may be performed on the video picture of the sequence; conversely, when sps_mtlc_in_loop_enabled_flag is equal to 0, the in-loop luma and chroma mapping transformation may not be performed on the video picture of the sequence.

sps_extension_flag is the control information for extending the sequence layer, and when sps_extension_flag is equal to 1, the sequence layer can be extended. sps_mtlc_out_of_loop_enabled_flag is the control information for enabling the out-loop luma and chroma mapping transformation in the sequence layer. When sps_mtlc_out_of_loop_enabled_flag is equal to 1, the out-loop luma and chroma mapping transformation may be performed on the video picture of the sequence; conversely, when sps_mtlc_out_of_loop_enabled_flag is equal to 0, the out-loop luma and chroma mapping transformation may not be performed on the video picture of the sequence.

TABLE 1

|  | Descriptor |
|---|---|
| seq_parameter_set_rbsp( ) { | |
| ...... | |
| sps_mtlc_in_loop_enabled_flag | u(1) |
| ...... | |
| sps_extension_flag | u(1) |
| if( sps_extension_flag ) | |
| sps_mtlc_out_of_loop_enabled_flag | u(1) |
| while( more_rbsp_data( ) ) | |
| sps_extension_data_flag | u(1) |
| rbsp_trailing_bits( ) | |
| } | |

Table 2 shows the identification information related to the extension in the PPS in the code stream described in the aforementioned embodiments. The identification information includes two control parameters, and the value of pps_picture_header_extension_present_flag and pps_slice_header_extension_present_flag is set to 1, indicating that the picture header (PH) parameter set and the slice header (SH) parameter set can be extended.

TABLE 2

|  | Descriptor |
|---|---|
| pic_parameter_set_rbsp( ) { | |
| ...... | |
| pps_picture_header_extension_present_flag | u(1) |
| pps_slice_header_extension_present_flag | u(1) |
| ...... | |
| } | |

Table 3 shows the identification information for in-loop and out-loop luma and chroma mapping transformation carried in the PH parameter set in the code stream described in the aforementioned embodiments.

When sps_mtlc_in_loop_enabled_flag is equal to 1, ph_mtlc_in_loop_enabled_flag is the control information for the in-loop luma and chroma mapping transformation. When ph_mtlc_in_loop_enabled_flag is equal to 1, the in-loop luma and chroma mapping transformation may be performed on the picture, and ph_mtlc_in_loop_aps_id and ph_chroma_residual_scale_flag are the parameter information for implementing the in-loop luma and chroma mapping transformation; conversely, when ph_mtlc_in_loop_enabled_flag is equal to 0, the in-loop luma and chroma mapping transformation may not be performed on the picture.

When pps_picture_header_extension_present_flag is equal to 1, the PH extension information is available, and ph_extension_length specifies the length of the PH extension information. The value of ph_extension_length here is 1 while the value of ph_extension_length in H.266/VVC version 1 is 0. When sps_mtlc_out_of_loop_enabled_flag is equal to 1, ph_mtlc_out_of_loop_enabled_flag is the control information for the in-loop luma and chroma mapping transformation. When ph_mtlc_out_of_loop_enabled_flag is equal to 1, the out-loop luma and chroma mapping transformation may be performed on the picture, ph_mtlc_out_of_loop_aps_id and ph_chroma_residual_scale_flag are the parameter information for implementing the out-loop luma and chroma mapping transformation, and rbsp_trailing_bits( ) is used for complementing bytes; conversely, when ph_mtlc_out_of_loop_enabled_flag is equal to 0, the out-loop luma and chroma mapping transformation may not be performed on the picture.

TABLE 3

|  | Descriptor |
|---|---|
| picture_header_structure( ) { | |
| ...... | |
| if(sps_mtlc_in_loop_enabled_flag) { | |
| ph_mtlc_in_loop_enabled_flag | u(1) |
| if( ph_mtlc_in_enabled_flag ) { | |
| ph_mtlc_in_loop_aps_id | u(2) |
| if( sps_chroma_format_idc != 0 ) | |
| ph_chroma_residual_scale_flag | u(1) |
| } | |
| } | |
| ...... | |
| if( pps_picture_header_extension_present_flag ) { | |
| ph_extension_length | ue(v) |
| for( i = 0; i < ph_extension_length; i++) | |
| if(sps_mtlc_out_of_loop_enabled_flag) { | |
| ph_mtlc_out_of_loop_enabled_flag | u(1) |
| if( ph_mtlc_out_of_loop_enabled_flag) { | |
| ph_mtlc_out_of_loop_aps_id | u(2) |
| if( sps_chroma_format_idc != 0 ) | |
| ph_chroma_residual_scale_flag | u(1) |
| } | |
| } | |
| rbsp_trailing_bits( ) | |
| } | |
| } | |

Table 4 shows the identification information for in-loop and out-loop luma and chroma mapping transformation carried in the SH parameter set in the code stream described in the aforementioned embodiments.

When sh_picture_header_in_slice_header_flag is equal to 0, it means that the slice-layer cannot inherit the identification information of the picture layer, and the on/off of the encoding tool can be flexibly selected.

When ph_mtlc_in_loop_enabled_flag is equal to 1, when the value of sh_mtlc_in_of_loop_used_flag is 1, the in-loop luma and chroma mapping transformation may be performed in the slice-layer; conversely, when sh_mtlc_in_loop_enabled_flag is equal to 0, the in-loop luma and chroma mapping transformation may not be performed in the slice-layer.

When pps_slice_header_extension_present_flag is equal to 1, sh_slice_header_extension_length indicates the length of the SH extension information and is set to 1 here. When ph_mtlc_out_of_loop_enabled_flag is equal to 1, when the value of sh_mtlc_out_of_loop_used_flag is 1, the out-loop luma and chroma mapping transformation may be performed in the slice-layer; conversely, when the value of sh_mtlc_out_of_loop_enabled_flag is 0, the out-loop luma and chroma mapping transformation may not be performed in the slice-layer.

TABLE 4

| | Descriptor |
|---|---|
| slice_header( ) {<br>sh_picture_header_in_slice_header_flag | u(1) |
| ......<br>if(ph_mtlc_in_loop_enabled_flag &&<br>!sh_picture_header_in_slice_header_flag )<br>sh_mtlc_in_loop_used_flag | u(1) |
| ......<br>if( pps_slice_header_extension_present_flag ) {<br>sh_slice_header_extension_length | ue(v) |
| for( i = 0; i < sh_slice_header_extension_length; i++)<br>if(ph_mtlc_out_of_loop_enabled_flag &&<br>!sh_picture_header_in_slice_header_flag )<br>sh_mtlc_out_of_loop_used_flag<br>rbsp_trailing_bits( )<br>}<br>......<br>} | u(1) |

In an example embodiment, the syntax and semantics of in-loop and out-loop luma and chroma mapping transformation in the sequence layer are given.

Table 5 shows the identification information for the luma and chroma mapping transformation carried in the SPS in the code stream described in the aforementioned embodiments.

sps_mtlc_enabled_flag is the control information for enabling the luma and chroma mapping transformation in the sequence layer. When sps_mtlc_enabled_flag is equal to 1, the luma and chroma mapping transformation may be performed on the video picture of the sequence; conversely, when sps_mtlc_enabled_flag is equal to 0, the luma and chroma mapping transformation may not be performed on the video picture of the sequence.

sps_extension_flag is the control information for extending the sequence layer, and when sps_extension_flag is equal to 1, the sequence layer can be extended.

sps_subpic_info_present_flag is the control information for extending a subpicture, and when sps_subpic_info_present_flag is equal to 1, the subpicture is enabled.

sps_subpic_mtlc_in_loop_enabled_flag[i] is the control information for enabling the in-loop luma and chroma mapping transformation in an $i^h$ subpicture. When sps_subpic_mtlc_in_loop_enabled_flag[i] is equal to 1, the in-loop luma and chroma mapping transformation may be performed on the subpicture; conversely, when sps_subpic_mtlc_in_loop_enabled_flag[i] is equal to 0, the in-loop luma and chroma mapping transformation may not be performed on the subpicture.

sps_subpic_mtlc_out_of_loop_enabled_flag[i] is the control information for enabling the out-loop luma and chroma mapping transformation in an ith subpicture. When sps_subpic_mtlc_out_of_loop_enabled_flag[i] is equal to 1, the out-loop luma and chroma mapping transformation may be performed on the subpicture; conversely, when sps_subpic_mtlc_out_of_loop_enabled_flag[i] is equal to 0, the out-loop luma and chroma mapping transformation may not be performed on the subpicture.

TABLE 5

| | Descriptor |
|---|---|
| seq_parameter_set_rbsp( ) {<br>......<br>sps_mtlc_in_loop_enabled_flag | u(1) |
| ......<br>sps_extension_flag | u(1) |
| if( sps_extension_flag )<br>if( sps_subpic_info_present_flag &&<br>sps_mtlc_in_loop_enabled_flag )<br>for( i = 0; sps_num_subpics_minus1 > 0 && i <=<br>sps_num_subpics_minus1; i++ ) {<br>sps_subpic_mtlc_in_loop_enabled_flag[ i ] | u(1) |
| sps_subpic_mtlc_out_of_loop_enabled_flag[ i ]<br>}<br>}<br>while( more_rbsp_data( ) )<br>sps_extension_data_flag | u(1) |
| rbsp_trailing_bits( )<br>} | |

Table 6 shows the identification information for in-loop and out-loop luma and chroma mapping transformation carried in the SH parameter set in the code stream described in the aforementioned embodiments.

When sh_picture_header_in_slice_header_flag is equal to 0, it means that the slice-layer cannot inherit the identification information of the picture layer, and the on/off of the encoding tool can be flexibly selected.

When the value of sh_mtlc_enabled_flag is 1, the luma and chroma mapping transformation may be performed in the slice-layer; conversely, when the value of sh_mtlc_enabled_flag is 0, the luma and chroma mapping transformation may not be performed in the slice-layer.

When pps_slice_header_extension_present_flag is equal to 1, sh_slice_header_extension_length indicates the length of the SH extension information and is set to 2 here. When sps_subpic_info_present_flag and sh_mtlc_enable_flag are both equal to 1, whether to perform luma and chroma mapping transformation needs to be determined according to the control information of the subpicture.

When sps_subpic_mtlc_in_loop_enabled_flag[i] is equal to 1 and sh_mtlc_in_loop_used_flag is equal to 1, the in-loop luma and chroma mapping transformation may be performed in the slice-layer; conversely, when sps_subpic_mtlc_out_of_loop_enabled_flag[i] is equal to 1 and sh_mtlc_out_of_loop_used_flag is equal to 1, the out-loop luma and chroma mapping transformation may be performed in the slice-layer.

TABLE 6

| | Descriptor |
|---|---|
| slice_header( ) {<br>sh_picture_header_in_slice_header_flag | u(1) |
| ......<br>if( sps_subpic_info_present_flag ) | |

TABLE 6-continued

| | Descriptor |
|---|---|
| sh_subpic_id | u(v) |
| ...... | |
| if(!sh_picture_header_in_slice_header_flag ) | |
| sh_mtlc_enable_flag | u(1) |
| ...... | |
| if( pps_slice_header_extension_present_flag ) { | |
| if( pps_slice_header_extension_present_flag ) { | |
| sh_slice_header_extension_length | ue(v) |
| for( i = 0; i < sh_slice_header_extension_length; i++) | |
| if(sps_subpic_info_present_flag && sh_mtlc_enable_flag){ | |
| if(sps_subpic_mtlc_in_loop_enabled_flag[sh_subpic_id ]) | |
| sh_mtlc_in_loop_used_flag | u(1) |
| if(sps_subpic_mtlc_out_of_loop_enabled_flag[sh_subpic_id ]) | |
| sh_mtlc_out_of_loop_used_flag | u(1) |
| } | |
| rbsp_trailing_bits( ) | |
| } | |
| } | |
| ...... | |
| } | |

In an example embodiment, the syntax and semantics of in-loop and out-loop luma and chroma mapping transformation in the picture layer are given.

Table 7 shows the identification information related to the extension in the PPS in the code stream described in the aforementioned embodiments. pps_picture_header_extension_present_flag is set to 1, indicating that the PH parameter set can be extended.

TABLE 7

| | Descriptor |
|---|---|
| pic_parameter_set_rbsp( ) { | |
| ...... | |
| pps_picture_header_extension_present_flag | u(1) |
| ...... | |
| } | |

Table 8 shows the identification information for in-loop and out-loop luma and chroma mapping transformation carried in the PH parameter set in the code stream described in the aforementioned embodiments.

ph_mtlc_in_loop_enabled_flag is the control information for the in-loop luma and chroma mapping transformation. When ph_mtlc_in_loop_enabled_flag is equal to 1, the in-loop luma and chroma mapping transformation may be performed on the picture, and ph_mtlc_in_loop_aps_id and ph_chroma_residual_scale_flag are the parameter information for implementing the in-loop luma and chroma mapping transformation; conversely, when ph_mtlc_in_loop_enabled_flag is equal to 0, the in-loop luma and chroma mapping transformation may not be performed on the picture.

When pps_picture_header_extension_present_flag is equal to 1, the PH extension information is available, and ph_extension_length specifies the length of the PH extension information. The value of ph_extension_length here is 1 while the value of ph_extension_length in H.266/VVC version 1 is 0. Ph_mtlc_out_of_loop_enabled_flag is the control information for the out-loop luma and chroma mapping transformation. When ph_mtlc_out_of_loop_enabled_flag is equal to 1, the out-loop luma and chroma mapping transformation may be performed on the picture, ph_mtlc_out_of_loop_aps_id and ph_chroma_residual_scale_flag are the parameter information for implementing the out-loop luma and chroma mapping transformation, and rbsp_trailing_bits( ) is used for complementing bytes; conversely, when ph_mtlc_out_of_loop_enabled_flag is equal to 0, the out-loop luma and chroma mapping transformation may not be performed on the picture.

TABLE 8

| | Descriptor |
|---|---|
| picture_header_structure( ) { | |
| ...... | |
| ph_mtlc_in_loop_enabled_flag | u(1) |
| if( ph_mtlc_in_loop_enabled_flag ) { | |
| ph_mtlc_in_loop_aps_id | u(2) |
| if( sps_chroma_format_idc != 0 ) | |
| ph_chroma_residual_scale_flag | u(1) |
| } | |
| } | |
| ...... | |
| if( pps_picture_header_extension_present_flag ) { | |
| ph_extension_length | ue(v) |
| for( i = 0; i < ph_extension_length; i++) | |
| ph_mtlc_out_of_loop_enabled_flag | u(1) |
| if( ph_mtlc_out_of_loop_enabled_flag) { | |
| ph_mtlc_out_of_loop_aps_id | u(2) |
| if( sps_chroma_format_idc != 0 ) | |
| ph_chroma_residual_scale_flag | u(1) |
| } | |
| } | |
| rbsp_trailing_bits( ) | |
| } | |
| } | |

In an example embodiment, the syntax and semantics of in-loop and out-loop luma and chroma mapping transformation in the picture layer and the slice-layer are given.

Table 9 shows the identification information related to the extension in the PPS in the code stream described in the aforementioned embodiments. The value of pps_slice_header_extension_present_flag is set to 1, indicating that the SH parameter set can be extended.

TABLE 9

| | Descriptor |
|---|---|
| pic_parameter_set_rbsp( ) { | |
| ...... | |
| pps_slice_header_extension_present_flag | u(1) |

TABLE 9-continued

| | Descriptor |
|---|---|
| ......  }  | |

Table 10 shows the identification information for in-loop and out-loop luma and chroma mapping transformation carried in the SH parameter set in the code stream described in the aforementioned embodiments.

When sh_picture_header_in_slice_header_flag is equal to 0, it means that the slice-layer cannot inherit the identification information of the picture layer, and the on/off of the encoding tool can be flexibly selected.

When the value of sh_mtlc_in_of_loop_used_flag is 1, the in-loop luma and chroma mapping transformation may be performed in the slice-layer; conversely, when the value of sh_mtlc_in_loop_enabled_flag is 0, the in-loop luma and chroma mapping transformation may not be performed in the slice-layer.

When pps_slice_header_extension_present_flag is equal to 1, sh_slice_header_extension_length indicates the length of the SH extension information and is set to 1 here. When ph_mtlc_out_of_loop_enabled_flag is equal to 1, the out-loop luma and chroma mapping transformation may be performed in the slice-layer; conversely, when sh_mtlc_out_of_loop_enabled_flag is equal to 0, the out-loop luma and chroma mapping transformation may not be performed in the slice-layer.

TABLE 10

| | Descriptor |
|---|---|
| slice_header( ) { | |
| sh_picture_header_in_slice_header_flag | u(1) |
| ...... | |
| if(!sh_picture_header_in_slice_header_flag ) | |
| sh_mtlc_in_loop_used_flag | u(1) |
| ...... | |
| if( pps_slice_header_extension_present_flag ) { | |
| sh_slice_header_extension_length | ue(v) |
| for( i = 0; i < sh_slice_header_extension_length; i++) | |
| sh_mtlc_out_of_loop_used_flag | u(1) |
| rbsp_trailing_bits( ) | |
| } | |
| ...... | |
| } | |

In an example embodiment, the control syntax of the in-loop and out-loop luma and chroma mapping transformation in the APS of the picture layer is specified, and according to the syntax specified herein, the decoder may choose to perform in-loop luma and chroma mapping transformation, may choose to perform out-loop luma and chroma mapping transformation, or may choose not to perform luma and chroma mapping transformation.

As shown in Table 11, the information on luma and chroma mapping transformation is set in the NAL unit header information containing AQPS information. The NAL unit type is 17, indicating pre-APS information, and the NAL unit type class is a non-video coding layer (VCL). The decoder parses the code stream to obtain a start symbol, and the codeword of the two bytes after the start symbol is nal_unit_header( ). The specific syntax of nal_unit_header( ) is shown below, where when the value of the NAL unit type is 17, the ASP information is contained.

TABLE 11

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

The syntax of the APS information is shown in Table 12. aps_params_type specifies the type of APS parameters. When the value of aps_params_type is 1, it indicates that the APS contains the information on luma and chroma mapping transformation. When the value of aps_adaptation_parameter_set_id is 0, it indicates that the APS contains the information on in-loop luma and chroma mapping transformation, and when the value of aps_adaptation_parameter_set_id is 1, it indicates that the APS contains the information on out-loop luma and chroma mapping transformation.

TABLE 12

| | Descriptor |
|---|---|
| adaptation_parameter_set_rbsp( ) { | |
| aps_params_type | u(3) |
| aps_adaptation_parameter_set_id | u(5) |
| aps_chroma_present_flag | u(1) |
| if( aps_params_type = = ALF_APS ) | |
| alf_data( ) | |
| else if( aps_params_type = = MTLC_APS ) | |
| mtlc_data( ) | |
| else if( aps_params_type = = SCALING_APS ) | |
| scaling_list_data( ) | |
| ...... | |
| } | |

The parameter information for in-loop (or out-loop) luma and chroma mapping transformation carried in the code stream described in the aforementioned embodiments is contained in the APS. Table 13 shows an optional syntax organization manner. In the data packet mtlc_data( ), mtlc_min_bin_idx is the minimum binary index (id) of in-loop (or out-loop) luma and chroma mapping transformation, indicating the minimum id of the piece in which the valid luma value is located after the luma range is equalized. mtlc_delta_max_bin_idx is opposite to mtlc_min_bin_idx. MtlcMaxBinIdx is the maximum binary index of in-loop (or out-loop) luma and chroma mapping transformation, indicating the maximum id of the piece in which the valid luma value is located after the luma range is equalized. mtlc_delta_max_bin_idx is used for indicating the difference between MtlcMaxBinIdx and mtlc_min_bin_idx. mtlc_delta_cw_prec_minus1 specifies the number of bits occupied by mtlc_delta_abs_cw. mtlc_delta_abs_cw[i] specifies the absolute value of the codeword of the ith bin and is the absolute value of the difference between the length of the equal segment of the source field before the luma mapping and the length of the segment of the mapping field after the luma mapping here. mtlc_delta_sign_cw_flag[i] is a sign for determining the preceding absolute value of the difference. mtlc_delta_abs_crs and mtlc_delta_sign_crs_flag specify the absolute value and the sign of the chroma residual scaling coefficient.

TABLE 13

| | Descriptor |
|---|---|
| mtlc_data( ) { | |
| mtlc_min_bin_idx | ue(v) |
| mtlc_delta_max_bin_idx | ue(v) |
| mtlc_delta_cw_prec_minus1 | ue(v) |
| for( i = mtlc_min_bin_idx; i <= MtlcMaxBinIdx; i++ ) { | |
| mtlc_delta_abs_cw[ i ] | ue(v) |
| if( mtlc_delta_abs_cw[ i ] > 0 ) | |
| mtlc_delta_sign_cw_flag[ i ] | u(1) |
| } | |
| if( aps_chroma_present_flag ) { | |
| mtlc_delta_abs_crs | u(3) |
| if( mtlc_delta_abs_crs > 0 ) | |
| mtlc_delta_sign_crs_flag | u(1) |
| } | |
| } | |

In an example embodiment, the out-loop luma and chroma mapping transformation is given in the SEI. The NAL unit type in the NAL unit header information nal_unit_header( ) is set to 23 and indicates the pre-SEI, and other settings in nal_unit_header( ) are the same as those in the aforementioned embodiment aforementioned embodiments. sei_rbsp( ) contains relevant the code stream sei_message( ), and sei_message( ) contains valid data information. When the value of payloadType is set to be different from other SEIs in the current H.266/VVC version 1 (for example, the value may be 100), the payload_size_byte contains the code stream information related to the out-loop luma and chroma mapping transformation.

Table 14 shows an optional syntax organization manner. When mtlc_cancel_flag is 1, the SEI related to the previous picture is cancelled, and the related SEI functions are not used for the picture. When mtlc_cancel_flag is 0, the previous SEI is still used (in the decoding process. When the current picture does not carry an SEI, the SEI of the previous picture retained in the memory will be used in the decoding process of the current picture), and the relevant SEI functions are enabled for the picture. When mtlc_persistence_flag is 1, the SEI is applied to the current picture and the pictures after the current picture, and when mtlc_persistence_flag is 0, the SEI is only applied to the current picture.

mtlc_min_bin_idx specifies the minimum binary index of mtlc (that is, luma and chroma mapping transformation, where m represents mapping, t represents transformation, l represented luma, and c represents chroma), indicating the minimum id of the piece in which the valid luma value is located after the luma range is equalized. mtlc_delta_max_bin_idx is opposite to mtlc_min_bin_idx. mtlcMaxBinIdx is the maximum binary index of luma and chroma mapping transformation, indicating the maximum id of the piece in which the valid luma value is located after the luma range is equalized. mtlc_delta_max_bin_idx in the standards is used for indicating the difference between mtlcMaxBinIdx and mtlc_min_bin_idx. mtlc_delta_cw_prec_minus1 specifies the number of bits occupied by mtlc_delta_abs_cw. mtlc_delta_abs_cw[i] specifies the absolute value of the codeword of the ith bin and is the absolute value of the difference between the length of the equal segment of the source field before the luma mapping and the length of the segment of the mapping field after the luma mapping here. mtlc_delta_sign_cw_flag[i] is a sign for determining the preceding absolute value of the difference. mtlc_delta_abs_crs and mtlc_delta_sign_crs_flag specify the absolute value and the sign of the chroma residual scaling coefficient.

TABLE 14

| | Descriptor |
|---|---|
| mtlc_data( ) { | |
| mtlc_cancel_flag | u(1) |
| if( !mtlc_cancel_flag ) { | |
| mtlc_persistence_flag | u(1) |
| mtlc_min_bin_idx | ue(v) |
| mtlc_delta_max_bin_idx | ue(v) |
| mtlc_delta_cw_prec_minus1 | ue(v) |
| for( i = mtlc_min_bin_idx; i <= mtlcMaxBinIdx; i++ ) { | |
| mtlc_delta_abs_cw[ i ] | ue(v) |
| if( mtlc_delta_abs_cw[ i ] > 0 ) | |
| mtlc_delta_sign_cw_flag[ i ] | u(1) |
| } | |
| if( aps_chroma_present_flag ) { | |
| mtlc_delta_abs_crs | u(3) |
| if( mtlc_delta_abs_crs > 0 ) | |
| mtlc_delta_sign_crs_flag | u(1) |
| } | |
| } | |
| } | |

In an example embodiment, the syntax of the in-loop and out-loop luma and chroma mapping transformation is specified in new NAL unit header information (nal_unit_header( )), and according to the syntax specified herein, the decoder may choose to perform in-loop luma and chroma mapping transformation and/or out-loop luma and chroma mapping transformation or may choose not to perform luma and chroma mapping transformation. The NAL unit type in the new nal_unit_header( ) is 26, and the NAL unit type class is a non-VCL. Other syntax of nal_unit_header( ) is the same as that in the aforementioned embodiment aforementioned embodiments.

Table 15 shows an optional syntax organization manner. mtlc_out_of_loop_used_flag and mtlc_in_loop_used_flag identify the on/off of the out-loop and in-loop luma and chroma mapping transformation, respectively, and the interpretation of the remaining syntax is the same as the corresponding descriptions in the aforementioned embodiments.

TABLE 15

| | Descriptor |
|---|---|
| mtlc_data( ) { | |
| mtlc_out_of_loop_used_flag | u(1) |
| mtlc_in_loop_used_flag | u(1) |
| if( mtlc_out_of_loop_used_flag ) { | |
| mtlc_min_bin_idx | ue(v) |
| mtlc_delta_max_bin_idx | ue(v) |
| mtlc_delta_cw_prec_minus1 | ue(v) |
| for( i = mtlc_min_bin_idx; i <= mtlcMaxBinIdx; i++ ) { | |
| mtlc_delta_abs_cw[ i ] | ue(v) |
| if( mtlc_delta_abs_cw[ i ] > 0 ) | |
| mtlc_delta_sign_cw_flag[ i ] | u(1) |
| } | |
| if( aps_chroma_present_flag ) { | |
| mtlc_delta_abs_crs | u(3) |
| if( mtlc_delta_abs_crs > 0 ) | |
| mtlc_delta_sign_crs_flag | u(1) |
| } | |
| } | |
| if( mtlc_in_loop_used_flag ) { | |
| mtlc_min_bin_idx | ue(v) |
| mtlc_delta_max_bin_idx | ue(v) |
| mtlc_delta_cw_prec_minus1 | ue(v) |
| for( i = mtlc_min_bin_idx; i <= mtlcMaxBinIdx; i++ ) { | |
| mtlc_delta_abs_cw[ i ] | ue(v) |
| if( mtlc_delta_abs_cw[ i ] > 0 ) | |
| mtlc_delta_sign_cw_flag[ i ] | u(1) |
| } | |
| if( aps_chroma_present_flag ) { | |
| mtlc_delta_abs_crs | u(3) |

TABLE 15-continued

| | Descriptor |
|---|---|
| if( mtlc_delta_abs_crs > 0 ) | |
| mtlc_delta_sign_crs_flag | u(1) |
| } | |
| } | |
| } | |

Figure 12:
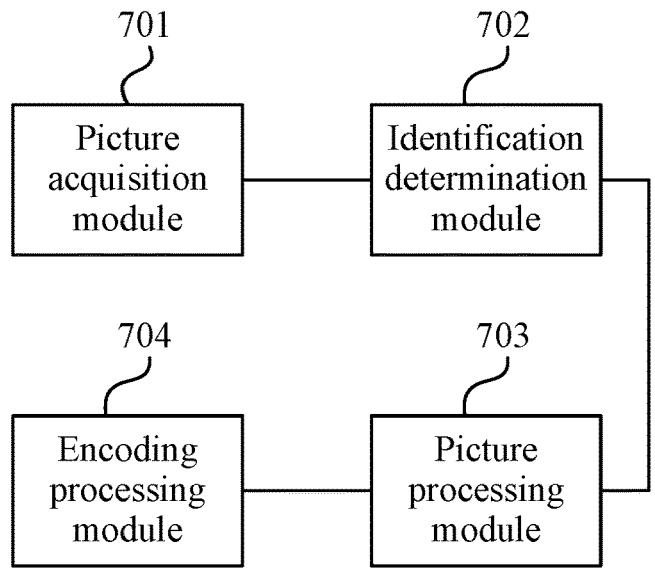
FIG. 12 is a structural diagram of a picture encoding apparatus according to an embodiment of the present application.

FIG. 12 is a structural diagram of a picture encoding apparatus according to an embodiment of the present application. The apparatus can execute the picture encoding method provided by any embodiment of the present application and has corresponding functional modules and beneficial effects for executing the method. The apparatus may be implemented by software and/or hardware and specifically includes a picture acquisition module 710, an identification determination module 720, a picture processing module 703, and an encoding processing module 704.

The picture acquisition module 701 is configured to acquire a video picture and determine a picture feature of the video picture.

The identification determination module 702 is configured to determine in-loop identification information and out-loop identification information according to the picture feature.

The picture processing module 703 is configured to process the video picture according to the in-loop identification information and the out-loop identification information.

The encoding processing module 704 is configured to encode the processed video picture to generate a code stream and write the in-loop identification information and the out-loop identification information into the code stream.

In the embodiment of the present application, the picture acquisition module determines a picture feature of an acquired video picture, the identification determination module generates in-loop identification information and out-loop identification information using the picture feature, the picture processing module processes the video picture according to the in-loop identification information and the out-loop identification information, and the encoding processing module encodes the processed video picture into a code stream and adds the generated in-loop identification information and out-loop identification information to the code stream. In this manner, the combination of out-loop and in-loop luma and chroma mapping transformation in the encoding process is achieved, thereby improving the video picture encoding performance.

In an embodiment, on the basis of the aforementioned embodiments of the present application, the picture feature in the apparatus includes at least one of the following: a luma dynamic range, a color space, texture information, a shape feature or a spatial relationship.

In an embodiment, on the basis of the aforementioned embodiments of the present application, at least one of the in-loop identification information or the out-loop identification information in the apparatus is carried in at least one of the following: NAL unit header information, an SPS, a PPS, a slice-layer parameter set, an SEI, video useability information or customized unit information.

In an embodiment, on the basis of the aforementioned embodiments of the present application, the picture processing module 703 in the apparatus includes one of: a first processing unit, a second processing unit, a third processing unit or a fourth processing unit.

The first processing unit is configured to perform first mapping transformation on the video picture according to the out-loop identification information and perform second mapping transformation on the video picture obtained after the first mapping transformation according to the in-loop identification information.

The second processing unit is configured to perform first mapping transformation on the video picture according to the out-loop identification information and determine not to perform second mapping transformation on the video picture obtained after the first mapping transformation according to the in-loop identification information.

The third processing unit is configured to determine not to perform first mapping transformation on the video picture according to the out-loop identification information and perform second mapping transformation on the video picture according to the in-loop identification information.

The fourth processing unit is configured to determine not to perform first mapping transformation on the video picture according to the out-loop identification information and determine not to perform second mapping transformation on the video picture according to the in-loop identification information.

In an embodiment, on the basis of the aforementioned embodiments of the present application, the first mapping transformation and the second mapping transformation in the apparatus include luma mapping transformation and chroma mapping transformation, respectively, where the luma mapping transformation includes luma component value mapping, the luma component value mapping is used for altering a luma dynamic range, and the chroma mapping transformation includes chroma component value mapping or chroma scaling processing dependent on the luma mapping transformation.

In an embodiment, on the basis of the aforementioned embodiments of the present application, at least one of the in-loop identification information or the out-loop identification information in the apparatus includes control information and parameter information, where the control information is carried in at least one of the following: NAL unit header information, an SPS, a PPS, a slice-layer parameter set, an SEI, video useability information or customized unit information, and the parameter information in the code stream is carried in at least one of the following: an APS, an SEI or a customized NAL unit.

In an embodiment, on the basis of the aforementioned embodiments of the present application, the parameter information of the in-loop identification information in the code stream and the parameter information of the out-loop identification information in the code stream in the apparatus are carried in one of the following manners.

The parameter information of the in-loop identification information and the parameter information of the out-loop identification information are each carried in a data packet oriented to luma and chroma mapping transformation in the APS.

The in-loop identification information is carried in a data packet oriented to luma and chroma mapping transformation in the APS, and the out-loop identification information is carried in a data packet of a custom SEI.

The parameter information of the in-loop identification information and the parameter information of the out-loop identification information are each carried in a data packet oriented to luma and chroma mapping transformation in the customized NAL unit.

Figure 13:
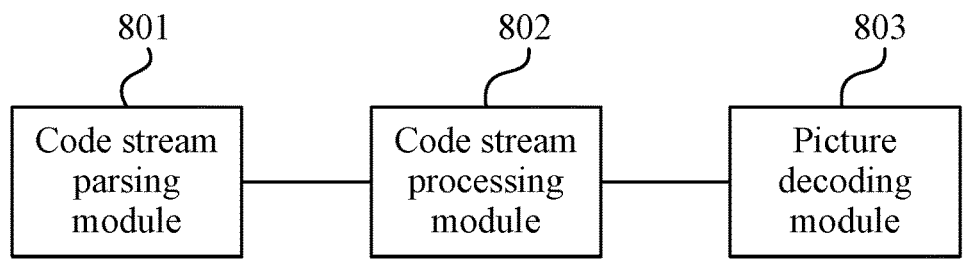
FIG. 13 is a structural diagram of a picture decoding apparatus according to an embodiment of the present application.

FIG. 13 is a structural diagram of a picture decoding apparatus according to an embodiment of the present application. The apparatus can execute the picture decoding method provided by any embodiment of the present application and has corresponding functional modules and beneficial effects for executing the method. The apparatus may be implemented by software and/or hardware and specifically includes a code stream parsing module 801, a code stream processing module 802, and a picture decoding module 803.

The code stream parsing module 801 is configured to acquire a code stream and parse the code stream to obtain in-loop identification information and out-loop identification information in the code stream.

The code stream processing module 802 is configured to process the code stream according to the in-loop identification information and the out-loop identification information.

The picture decoding module 803 is configured to decode the processed code stream to generate a video picture.

In the embodiment of the present application, the code stream parsing module receives a code stream and extracts out-loop identification information and in-loop identification information carried in the code stream, the code stream processing module processes the received code stream according to the out-loop identification information and the in-loop identification information, and the picture decoding module decodes the code stream into a video picture. In this manner, the combination of out-loop and in-loop luma and chroma mapping transformation is achieved, thereby improving the quality of the decoded video picture.

In an embodiment, on the basis of the aforementioned embodiments of the present application, at least one of the in-loop identification information or the out-loop identification information in the apparatus is carried in at least one of the following: NAL unit header information, an SPS, a PPS, a slice-layer parameter set, an SEI, video useability information or customized unit information.

In an embodiment, on the basis of the aforementioned embodiments of the present application, the code stream processing module 802 in the apparatus includes a first processing unit, a second processing unit, a third processing unit or a fourth processing unit.

The first processing unit is configured to perform fourth mapping transformation on the code stream according to the in-loop identification information and perform third mapping transformation on the code stream obtained after the fourth mapping transformation according to the out-loop identification information.

The second processing unit is configured to perform fourth mapping transformation on the code stream according to the in-loop identification information and determine not to perform third mapping transformation on the code stream obtained after the fourth mapping transformation according to the out-loop identification information.

The third processing unit is configured to determine not to perform fourth mapping transformation on the code stream according to the in-loop identification information and perform third mapping transformation on the code stream according to the out-loop identification information.

The fourth processing unit is configured to determine not to perform fourth mapping transformation on the code stream according to the in-loop identification information and determine not to perform third mapping transformation on the code stream according to the out-loop identification information.

In an embodiment, on the basis of the aforementioned embodiments of the present application, the third mapping transformation and the fourth mapping transformation in the apparatus include luma mapping transformation and chroma mapping transformation, respectively, where the luma mapping transformation includes luma component value mapping, the luma component value mapping is used for altering a luma dynamic range, and the chroma mapping transformation includes chroma component value mapping or chroma scaling processing dependent on the luma mapping transformation.

In an embodiment, on the basis of the aforementioned embodiments of the present application, at least one of the in-loop identification information or the out-loop identification information in the apparatus includes control information and parameter information, where the control information is carried in at least one of the following: NAL unit header information, an SPS, a PPS, a slice-layer parameter set, an SEI, video useability information or customized unit information, and the parameter information in the code stream is carried in at least one of the following: an APS, an SEI or a customized NAL unit.

In an embodiment, on the basis of the aforementioned embodiments of the present application, the parameter information of the in-loop identification information in the code stream and the parameter information of the out-loop identification information in the code stream in the apparatus are carried in one of the following manners.

The parameter information of the in-loop identification information and the parameter information of the out-loop identification information are each carried in a data packet oriented to luma and chroma mapping transformation in the APS.

The in-loop identification information is carried in a data packet oriented to luma and chroma mapping transformation in the APS, and the out-loop identification information is carried in a data packet of a custom SEI.

The parameter information of the in-loop identification information and the parameter information of the out-loop identification information are each carried in a data packet oriented to luma and chroma mapping transformation in the customized NAL unit.

Figure 14:
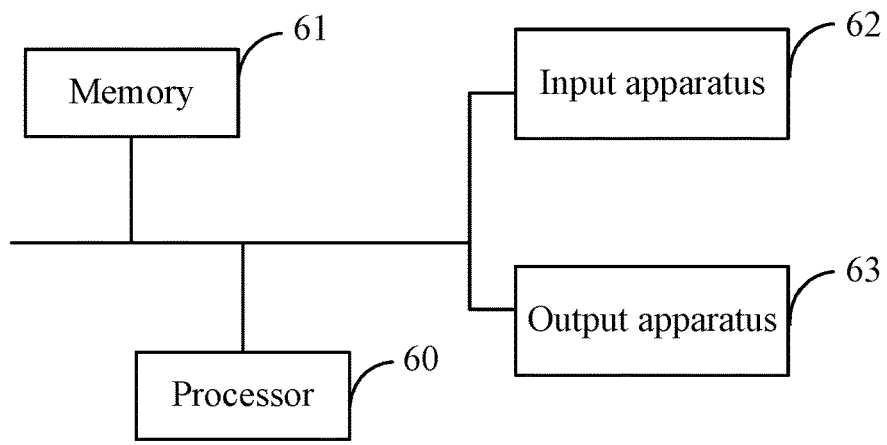
FIG. 14 is a structural diagram of an electronic device according to an embodiment of the present application.

FIG. 14 is a structural diagram of an electronic device according to an embodiment of the present application. The electronic device includes a processor 60, a memory 61, an input apparatus 62, and an output apparatus 63. One or more processors 60 may be provided in the electronic device, and one processor 60 is illustrated as an example in FIG. 14. The processor 60, the memory 61, the input apparatus 62, and the output apparatus 53 in the electronic device may be connected via a bus or in other manners, and the connection via a bus is illustrated as an example in FIG. 14.

As a computer-readable storage medium, the memory 61 may be configured to store software programs and computer-executable programs and modules, such as the modules (such as the picture acquisition module 710, the identification determination module 720, the picture processing module 703 and the encoding processing module 704, and/or the code stream parsing module 801, the code stream processing module 802 and the picture decoding module 803) corresponding to the picture encoding apparatus and/or the picture decoding apparatus in the embodiments of the present application. The processor 60 executes software programs, instructions and modules stored in the memory 61 to perform various function applications and data processing of the electronic device, that is, to implement the picture encoding method and/or the picture decoding method described above.

The memory 61 may mainly include a program storage region and a data storage region. The program storage region may store an operating system and an application program required by at least one function. The data storage region may store data created based on the use of the electronic device. In addition, the memory 61 may include a high-speed random-access memory and may also include a non-volatile memory such as at least one disk memory, a flash memory or another non-volatile solid-state memory. In some examples, the memory 61 may further include memories which are remotely disposed with respect to the processor 60. These remote memories may be connected to the electronic device via a network. Examples of the preceding network include, but are not limited to, the Internet, an intranet, a local area network, a mobile communication network, and combinations thereof.

The input apparatus 62 may be configured to receive inputted digital or character information and generate key signal input related to user settings and function control of the electronic device. The output apparatus 63 may include a display device such as a display screen.

Figure 15:
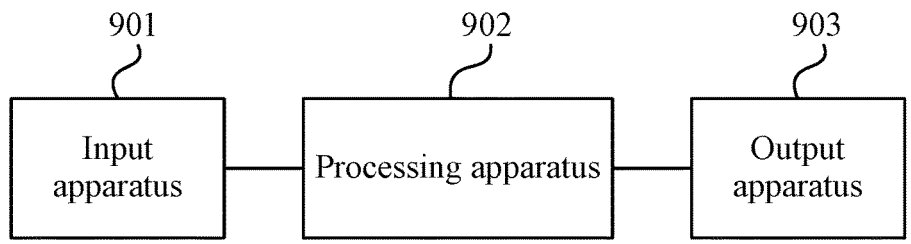
FIG. 15 is a structural diagram of an encoder according to an embodiment of the present application.

FIG. 15 is a structural diagram of an encoder according to an embodiment of the present application. In an example embodiment, the encoder shown in FIG. 15 is applied to an apparatus for encoding a video. The input of the apparatus is a picture contained in a video, and the output of the apparatus is a picture code stream, a transport stream containing the picture code stream, or, a media file containing the picture code stream. As shown in FIG. 15, the encoder includes an input apparatus 901, a processing apparatus 902, and an output apparatus 903.

The input apparatus 901, is configured to input a picture.

The processing apparatus 902, is configured to process the picture and perform encoding. The specific process is the same as the operations in the embodiments described above.

The output apparatus 903, is configured to output a code stream.

Figure 16:
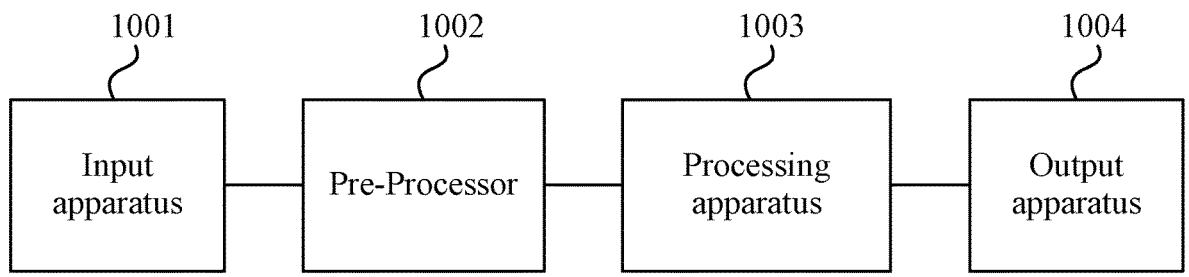
FIG. 16 is a structural diagram of an encoder according to an embodiment of the present application.

FIG. 16 is a structural diagram of an encoder according to an embodiment of the present application. In an example embodiment, the encoder shown in FIG. 16 is applied to an apparatus for encoding a video. The input of the apparatus is a picture contained in a video, and the output of the apparatus is a picture code stream, a transport stream containing the picture code stream, or, a media file containing the picture code stream. As shown in FIG. 16, the encoder includes an input apparatus 1001, a pre-processor 1002, a processing apparatus 1003, and an output apparatus 1004.

The input apparatus 1001 is configured to input a picture.

The pre-processor 1002 is configured to process the picture. The specific process is the same as the operations 302 and 303 of the picture encoding method in the embodiments described above.

The processing apparatus 1003, is configured to process the picture and perform encoding. The specific process is the same as the operations 304, 305 and 306 of the picture encoding method in the embodiments described above.

The output apparatus 1004, is configured to output a code stream.

Figure 17:
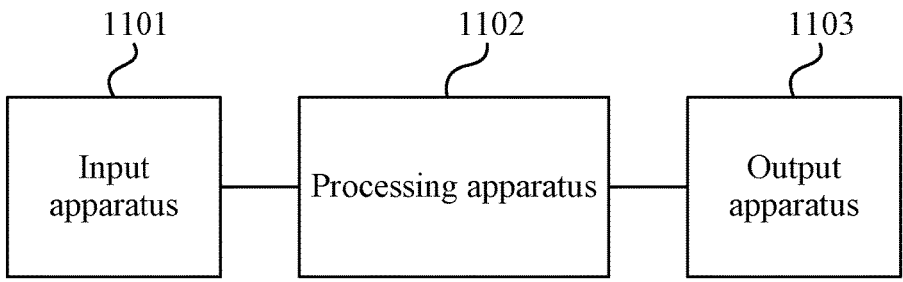
FIG. 17 is a structural diagram of a decoder according to an embodiment of the present application.

FIG. 17 is a structural diagram of a decoder according to an embodiment of the present application. In an example embodiment, the decoder shown in FIG. 17 is applied to an apparatus for decoding a video code stream. The input of the apparatus is a picture code stream, a transport stream containing the picture code stream, or, a media file containing the picture code stream, and the output thereof is a picture consisting of a video. As shown in FIG. 17, the decoder includes an input apparatus 1101, a processing apparatus 1102, and an output apparatus 1103.

The input apparatus 1101 is configured to input a code stream.

The processing apparatus 1102 is configured to parse the code stream to acquire a picture and process the picture. The specific process is the same as the operations of the picture decoding method in the embodiments described above.

The output apparatus 1103 is configured to output the picture.

Figure 18:
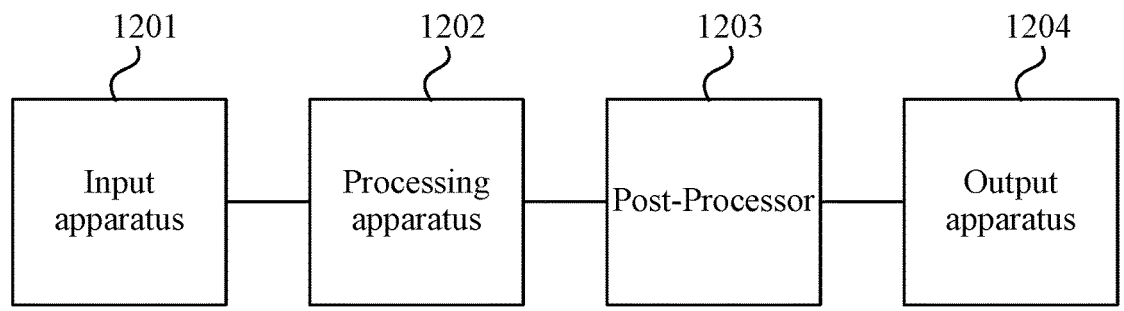
FIG. 18 is a structural diagram of a decoder according to an embodiment of the present application.

FIG. 18 is a structural diagram of a decoder according to an embodiment of the present application. In an example embodiment, the decoder shown in FIG. 18 is applied to an apparatus for decoding a video code stream. The input of the apparatus is a picture code stream, a transport stream containing the picture code stream, or a media file containing the picture code stream, and the output of the apparatus is a picture consisting of a video. As shown in FIG. 18, the decoder includes an input apparatus 1201, a processing apparatus 1202, a post-processor 1203 and an output apparatus 1204.

The input apparatus 1201 is configured to input a code stream.

The processing apparatus 1202 is configured to parse the code stream to acquire a picture and perform inverse processing on the picture. The specific process is the same as the operations 501, 502, 503 and 504 of the video decoding method in the embodiments described above.

The post-processor 1203 is configured to process the picture. The specific process is the same as the operation 506 of the picture decoding method in the embodiments described above.

The output apparatus 1204 is configured to output the picture.

The embodiments of the present application further provide a storage medium including computer-executable instructions. The computer-executable instructions, when executed by a computer processor, are used for performing a picture encoding method. The method includes the following operations.

A video picture is acquired, and a picture feature of the video picture is determined.

In-loop identification information and out-loop identification information are determined according to the picture feature.

The video picture is processed according to the in-loop identification information and the out-loop identification information.

The processed video picture is encoded to generate a code stream, and the in-loop identification information and the out-loop identification information are written into the code stream.

The computer-executable instructions, when executed by a computer processor, is further used for or is alternatively used for performing a picture decoding method. The method includes the following operations.

A code stream is acquired, and the code stream is parsed to obtain in-loop identification information and out-loop identification information in the code stream.

The code stream is processed according to the in-loop identification information and the out-loop identification information.

The processed code stream is decoded to generate a video picture.

From the description of the aforementioned embodiments, it is apparent to those skilled in the art that the present application may be implemented by software plus necessary general-purpose hardware or may of course be implemented by hardware. However, in many cases, the former is a preferred implementation. Based on this understanding, the solutions of the present application substantially or the part contributing to the related art may be embodied in the form of a software product. The computer software product may be stored in a computer-readable storage medium such as a floppy disk, a read-only memory (ROM), a random-access memory (RAM), a flash memory, a hard disk, or an optical disk of a computer and includes several instructions for causing a computer device (which may be a personal computer, a server, or a network device) to perform the method in each embodiment of the present application.

It is to be noted that units and modules involved in the apparatus embodiments are divided according to functional logic, and the division is not limited to this, as long as the corresponding functions can be implemented. In addition, the specific names of functional units are intended to distinguish between each other and are not intended to limit the scope of the present application.

It is to be understood by those of ordinary skill in the art that some or all operations of the preceding method and function modules/units in the preceding system or device may be implemented as software, firmware, hardware and suitable combinations thereof.

In a hardware implementation, the division of the function modules/units described above does not necessarily correspond to the division of physical components. For example, one physical component may have multiple functions, or one function or operation may be implemented by several physical components cooperatively. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As is well known to those of ordinary skill in the art, the term computer storage media include volatile and nonvolatile, removable and non-removable media implemented in any method or technology for storing information (such as computer-readable instructions, data structures, program modules or other data). The computer storage media include, but are not limited to, a RAM, a ROM, an electrically erasable programmable read-only memory (EE-PROM), a flash memory or other memory technologies, a compact disc read-only memory (CD-ROM), a digital video disc (DVD) or other optical disk memories, a magnetic cassette, a magnetic tape, a magnetic disk memory or other magnetic storage apparatuses, or any other medium that can be used for storing desired information and that can be accessed by a computer. Additionally, as known to those of ordinary skill in the art, the communication media generally include computer-readable instructions, data structures, program modules or other data in a modulated data signal such as a carrier wave or other transport mechanism and include any information delivery media.

The preferred embodiments of the present application are illustrated with reference to drawings and are not intended to limit the scope of the present application. Any modification, equivalent substitution and improvement made by those skilled in the art without departing from the scope and spirit of the present application shall fall within the scope of the present application.

What is claimed is:

1. A picture encoding method, comprising:
   acquiring a video picture, and determining a picture feature of the video picture;
   determining in-loop identification information and out-loop identification information according to the picture feature, wherein the out-loop identification information is used to indicate whether to perform first mapping transformation on the video picture, and the first mapping transformation comprises luma mapping transformation and chroma mapping transformation for out-loop, and the in-loop identification information is used to indicate whether to perform second mapping transformation on the video picture, and the second mapping transformation comprises luma mapping transformation and chroma mapping transformation for in-loop;
   processing the video picture according to the in-loop identification information and the out-loop identification information; and
   encoding the processed video picture to generate a code stream, and writing the in-loop identification information and the out-loop identification information into the code stream.

2. The method of claim 1, wherein the picture feature comprises at least one of the following:
   a luma dynamic range, a color space, texture information, a shape feature or a spatial relationship.

3. The method of claim 1, wherein at least one of the in-loop identification information or the out-loop identification information is carried in at least one of the following:
   network abstraction layer unit header information, a sequence-layer parameter set, a picture-layer parameter set, a slice-layer parameter set, supplemental enhancement information, video useability information or customized unit information.

4. The method of claim 1, wherein processing the video picture according to the in-loop identification information and the out-loop identification information comprises one of the following:
   performing the first mapping transformation on the video picture according to the out-loop identification information, and performing the second mapping transformation on the video picture obtained after the first mapping transformation according to the in-loop identification information;
   performing the first mapping transformation on the video picture according to the out-loop identification information, and determining not to perform the second mapping transformation on the video picture obtained after the first mapping transformation according to the in-loop identification information;
   determining not to perform the first mapping transformation on the video picture according to the out-loop identification information, and performing the second mapping transformation on the video picture according to the in-loop identification information; or
   determining not to perform the first mapping transformation on the video picture according to the out-loop identification information, and determining not to perform the second mapping transformation on the video picture according to the in-loop identification information.

5. The method of claim 4, wherein for each of the first mapping transformation and the second mapping transformation, the luma mapping transformation comprises luma component value mapping, the luma component value mapping is used for altering a luma dynamic range, and the chroma mapping transformation comprises chroma component value mapping or chroma scaling processing dependent on the luma mapping transformation.

6. The method of claim 1, wherein at least one of the in-loop identification information or the out-loop identification information comprises control information and parameter information, the control information is used to control whether performing the first mapping transformation or the second mapping transformation, and the parameter information is information about one or more parameters used by the first mapping transformation or the second mapping transformation, wherein the control information is carried in at least one of the following: network abstraction layer unit header information, a sequence-layer parameter set, a picture-layer parameter set, a slice-layer parameter set, supplemental enhancement information, video useability information or customized unit information, and wherein the parameter information in the code stream is carried in at least one of the following: an adaptation parameter set, supplemental enhancement information or a customized network abstraction layer unit.

7. The method of claim 6, wherein the parameter information of the in-loop identification information in the code stream and the parameter information of the out-loop identification information in the code stream are each carried in one of the following manners:

the parameter information of the in-loop identification information and the parameter information of the out-loop identification information are each carried in a data packet oriented to luma and chroma mapping transformation in the adaptation parameter set;

the parameter information of the in-loop identification information is carried in a data packet oriented to luma and chroma mapping transformation in the adaptation parameter set, and the parameter information of the out-loop identification information is carried in a data packet of customized supplemental enhancement information; or the parameter information of the in-loop identification information and the parameter information of the out-loop identification information are each carried in a data packet oriented to luma and chroma mapping transformation in the customized network abstraction layer unit.

8. A non-transitory computer-readable storage medium storing a computer program, wherein the computer program, when executed by a processor, performs the picture encoding method of claim 1.

9. A picture decoding method, comprising:

acquiring a code stream, and parsing the code stream to obtain in-loop identification information and out-loop identification information in the code stream, wherein the out-loop identification information is used to indicate whether to perform first mapping transformation on the code stream, and the first mapping transformation comprises luma mapping transformation and chroma mapping transformation for out-loop, and the in-loop identification information is used to indicate whether to perform second mapping transformation on the code stream, and the second mapping transformation comprises luma mapping transformation and chroma mapping transformation for in-loop;

processing the code stream according to the in-loop identification information and the out-loop identification information; and decoding the processed code stream to generate a video picture.

10. The method of claim 9, wherein at least one of the in-loop identification information or the out-loop identification information is carried in at least one of the following:

network abstraction layer unit header information, a sequence-layer parameter set, a picture-layer parameter set, a slice-layer parameter set, supplemental enhancement information, video useability information or customized unit information.

11. The method of claim 9, wherein processing the code stream according to the in-loop identification information and the out-loop identification information comprises one of the following:

performing the second mapping transformation on the code stream according to the in-loop identification information, and performing the first mapping transformation on the code stream obtained after the second mapping transformation according to the out-loop identification information;

performing the second mapping transformation on the code stream according to the in-loop identification information, and determining not to perform the first mapping transformation on the code stream obtained after the second mapping transformation according to the out-loop identification information;

determining not to perform the second mapping transformation on the code stream according to the in-loop identification information, and performing the first mapping transformation on the code stream according to the out-loop identification information; or determining not to perform the second mapping transformation on the code stream according to the in-loop identification information, and determining not to perform the first mapping transformation on the code stream according to the out-loop identification information.

12. The method of claim 11, wherein for each of the first mapping transformation and the second mapping transformation, the luma mapping transformation comprises luma component value mapping, the luma component value mapping is used for altering a luma dynamic range, and the chroma mapping transformation comprises chroma component value mapping or chroma scaling processing dependent on the luma mapping transformation.

13. The method of claim 9, wherein at least one of the in-loop identification information or the out-loop identification information comprises control information and parameter information, the control information is used to control whether performing the first mapping transformation or the second mapping transformation, and the parameter information is information about one or more parameters used by the first mapping transformation or the second mapping transformation, wherein the control information is carried in at least one of the following: network abstraction layer unit header information, a sequence-layer parameter set, a picture-layer parameter set, a slice-layer parameter set, supplemental enhancement information, video useability information or customized unit information, and wherein the parameter information in the code stream is carried in at least one of the following: an adaptation parameter set, supplemental enhancement information or a customized network abstraction layer unit.

14. The method of claim 13, wherein the parameter information of the in-loop identification information in the code stream and the parameter information of the out-loop identification information in the code stream are each carried in one of the following manners:

the parameter information of the in-loop identification information and the parameter information of the out-loop identification information are each carried in a data packet oriented to luma and chroma mapping transformation in the adaptation parameter set;

the parameter information of the in-loop identification information is carried in a data packet oriented to luma and chroma mapping transformation in the adaptation parameter set, and the parameter information of the out-loop identification information is carried in a data packet of customized supplemental enhancement information; or the parameter information of the in-loop identification information and the parameter information of the out-loop identification information are each carried in a data packet oriented to luma and chroma mapping transformation in the customized network abstraction layer unit.

15. An electronic device, comprising:
one or more processors; and
a memory configured to store one or more programs;
wherein the one or more programs, when executed by the one or more processors, enable the one or more processors to perform at least one of the following:
picture encoding which comprises:
acquiring a video picture, and determining a picture feature of the video picture;
determining in-loop identification information and out-loop identification information according to the picture feature, wherein the out-loop identification information is used to indicate whether to perform first mapping transformation on the video picture, and the first mapping transformation comprises luma mapping transformation and chroma mapping transformation for out-loop, and the in-loop identification information is used to indicate whether to perform second mapping transformation on the video picture, and the second mapping transformation comprises luma mapping transformation and chroma mapping transformation for in-loop;
processing the video picture according to the in-loop identification information and the out-loop identification information; and
encoding the processed video picture to generate an encoded code stream, and writing the in-loop identification information and the out-loop identification information into the encoded code stream;
or
picture decoding which comprises:
acquiring a code stream, and parsing the code stream to obtain the in-loop identification information and the out-loop identification information in the code stream, wherein the out-loop identification information is used to indicate whether to perform first mapping transformation on the code stream, and the first mapping transformation comprises luma mapping transformation and chroma mapping transformation for out-loop, and the in-loop identification information is used to indicate whether to perform second mapping transformation on the code stream, and the second mapping transformation comprises luma mapping transformation and chroma mapping transformation for in-loop;
processing the code stream according to the in-loop identification information and the out-loop identification information; and
decoding the processed code stream to generate a decoded video picture.

16. The electronic device according to claim 15, wherein the picture feature comprises at least one of the following:
a luma dynamic range, a color space, texture information, a shape feature or a spatial relationship.

17. The electronic device according to claim 15, wherein at least one of the in-loop identification information or the out-loop identification information is carried in at least one of the following:
network abstraction layer unit header information, a sequence-layer parameter set, a picture-layer parameter set, a slice-layer parameter set, supplemental enhancement information, video useability information or customized unit information.

18. The electronic device according to claim 15, wherein processing the video picture according to the in-loop identification information and the out-loop identification information comprises one of the following:
performing the first mapping transformation on the video picture according to the out-loop identification information, and performing the second mapping transformation on the video picture obtained after the first mapping transformation according to the in-loop identification information;
performing the first mapping transformation on the video picture according to the out-loop identification information, and determining not to perform the second mapping transformation on the video picture obtained after the first mapping transformation according to the in-loop identification information;
determining not to perform the first mapping transformation on the video picture according to the out-loop identification information, and performing the second mapping transformation on the video picture according to the in-loop identification information; or
determining not to perform the first mapping transformation on the video picture according to the out-loop identification information, and determining not to perform the second mapping transformation on the video picture according to the in-loop identification information.

19. The electronic device according to claim 18, wherein for each of the first mapping transformation and the second mapping transformation of the picture encoding and the picture decoding, the luma mapping transformation comprises luma component value mapping, the luma component value mapping is used for altering a luma dynamic range, and the chroma mapping transformation comprises chroma component value mapping or chroma scaling processing dependent on the luma mapping transformation.

20. The electronic device according to claim 15, wherein at least one of the in-loop identification information or the out-loop identification information comprises control information and parameter information, the control information is used to control whether performing the first mapping transformation or the second mapping transformation, and the parameter information is information about one or more parameters used by the first mapping transformation or the second mapping transformation,
wherein the control information is carried in at least one of the following: network abstraction layer unit header information, a sequence-layer parameter set, a picture-layer parameter set, a slice-layer parameter set, supplemental enhancement information, video useability information or customized unit information, and
wherein the parameter information in the encoded code stream or the code stream is carried in at least one of the following: an adaptation parameter set, supplemental enhancement information or a customized network abstraction layer unit.

* * * * *